US008006020B2

(12) United States Patent
Minoo

(10) Patent No.: US 8,006,020 B2
(45) Date of Patent: *Aug. 23, 2011

(54) PERSONAL MEDIA DEVICE DOCKING STATION HAVING AN ACCESSORY DEVICE DETECTOR

(75) Inventor: Jahan Christian Minoo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/873,718

(22) Filed: Sep. 1, 2010

(65) Prior Publication Data

US 2010/0321005 A1  Dec. 23, 2010

Related U.S. Application Data

(63) Continuation of application No. 11/810,171, filed on Jun. 5, 2007, now Pat. No. 7,840,740.

(51) Int. Cl.
G06F 13/00 (2006.01)
H05K 7/10 (2006.01)
(52) U.S. Cl. ........................................ 710/303; 710/300
(58) Field of Classification Search .................. 710/104, 710/105, 300–306
See application file for complete search history.

(56) References Cited

U.S. PATENT DOCUMENTS

| 5,265,238 A | 11/1993 | Canova, Jr. et al. |
| 5,333,176 A | 7/1994 | Burke et al. |
| 5,497,490 A | 3/1996 | Harada et al. |
| 5,708,799 A | 1/1998 | Gafken et al. |
| 5,751,548 A | 5/1998 | Hall et al. |
| 5,794,164 A | 8/1998 | Beckert et al. |
| 5,798,951 A | 8/1998 | Cho et al. |
| 5,859,628 A | 1/1999 | Ross et al. |
| 5,859,762 A | 1/1999 | Clark et al. |
| 5,867,406 A | 2/1999 | Yanagisawa et al. |
| 5,884,049 A | 3/1999 | Atkinson |
| 6,196,850 B1 | 3/2001 | Dietz et al. |
| 6,246,935 B1 | 6/2001 | Buckley |
| 6,366,840 B1 | 4/2002 | Buckley |
| 6,459,696 B1 | 10/2002 | Carpenter et al. |
| 6,493,782 B1 | 12/2002 | Verdun et al. |
| 6,577,928 B2 | 6/2003 | Obradovich |
| 6,622,083 B1 | 9/2003 | Knockeart et al. |
| 6,636,918 B1 | 10/2003 | Aguilar et al. |
| 6,654,826 B1 | 11/2003 | Cho et al. |
| 6,665,764 B2 | 12/2003 | Wurzburg |
| 6,684,347 B1 | 1/2004 | Coffey |
| 6,718,425 B1 | 4/2004 | Pajakowski et al. |
| 6,868,468 B2 | 3/2005 | Boz et al. |

(Continued)

FOREIGN PATENT DOCUMENTS

EP    1022643 A1    7/2000

(Continued)

Primary Examiner — Brian T Misiura
Assistant Examiner — Trisha Vu
(74) Attorney, Agent, or Firm — Kramer Levin Naftalis & Frankel LLP

(57) ABSTRACT

Systems and methods include a circuit for detecting the insertion of a component into a docking station, e.g., an audio plug. When the component is inserted into the docking station, an electronic switch can be opened. When the switch is opened, a detector (e.g., monostable multivibrator) for detecting a change in state of the switch can be activated. Responsive to the detected change in state, the detector can issue a signal to a control device. Responsive to the signal, the controller can look to a resistive identification circuit and, based on its resistance, determine whether the component has just been inserted or removed from the docking station.

6 Claims, 18 Drawing Sheets

U.S. PATENT DOCUMENTS

| | | | |
|---|---|---|---|
| 6,928,504 B2 | 8/2005 | Peacock |
| 6,990,546 B2 | 1/2006 | Tang et al. |
| 6,993,615 B2 | 1/2006 | Falcon |
| 7,117,286 B2 | 10/2006 | Falcon |
| 7,231,481 B2 | 6/2007 | Scott et al. |
| 7,234,014 B2 | 6/2007 | Molander et al. |
| 7,293,122 B1 | 11/2007 | Schubert et al. |
| 7,296,107 B2 | 11/2007 | Lunsford et al. |
| 7,305,506 B1 | 12/2007 | Lydon et al. |
| 7,386,648 B2 | 6/2008 | Morrow et al. |
| 7,415,563 B1 | 8/2008 | Holden et al. |
| 7,441,058 B1 | 10/2008 | Bolton et al. |
| 7,441,062 B2 | 10/2008 | Novotney et al. |
| 7,472,215 B1 | 12/2008 | Mok et al. |
| 7,525,216 B2 | 4/2009 | Tupman et al. |
| 7,526,588 B1 | 4/2009 | Schubert et al. |
| 7,529,870 B1 | 5/2009 | Schubert et al. |
| 7,529,871 B1 | 5/2009 | Schubert et al. |
| 7,529,872 B1 | 5/2009 | Schubert et al. |
| 7,574,177 B2 | 8/2009 | Tupman et al. |
| 7,590,783 B2 | 9/2009 | Lydon et al. |
| 2003/0041206 A1 | 2/2003 | Dickie |
| 2003/0128504 A1 | 7/2003 | Enners et al. |
| 2003/0215102 A1 | 11/2003 | Marlowe |
| 2004/0019724 A1 | 1/2004 | Singleton et al. |
| 2004/0034730 A1 | 2/2004 | Yu |
| 2004/0224638 A1 | 11/2004 | Fadell et al. |
| 2006/0190653 A1 | 8/2006 | Wahler et al. |
| 2007/0226379 A1 | 9/2007 | Lin et al. |
| 2008/0025172 A1 | 1/2008 | Holden et al. |
| 2008/0178304 A1 | 7/2008 | Jeansonne et al. |
| 2009/0132076 A1 | 5/2009 | Holden et al. |

FOREIGN PATENT DOCUMENTS

| | | | |
|---|---|---|---|
| WO | 2007024443 A1 | 3/2007 | |

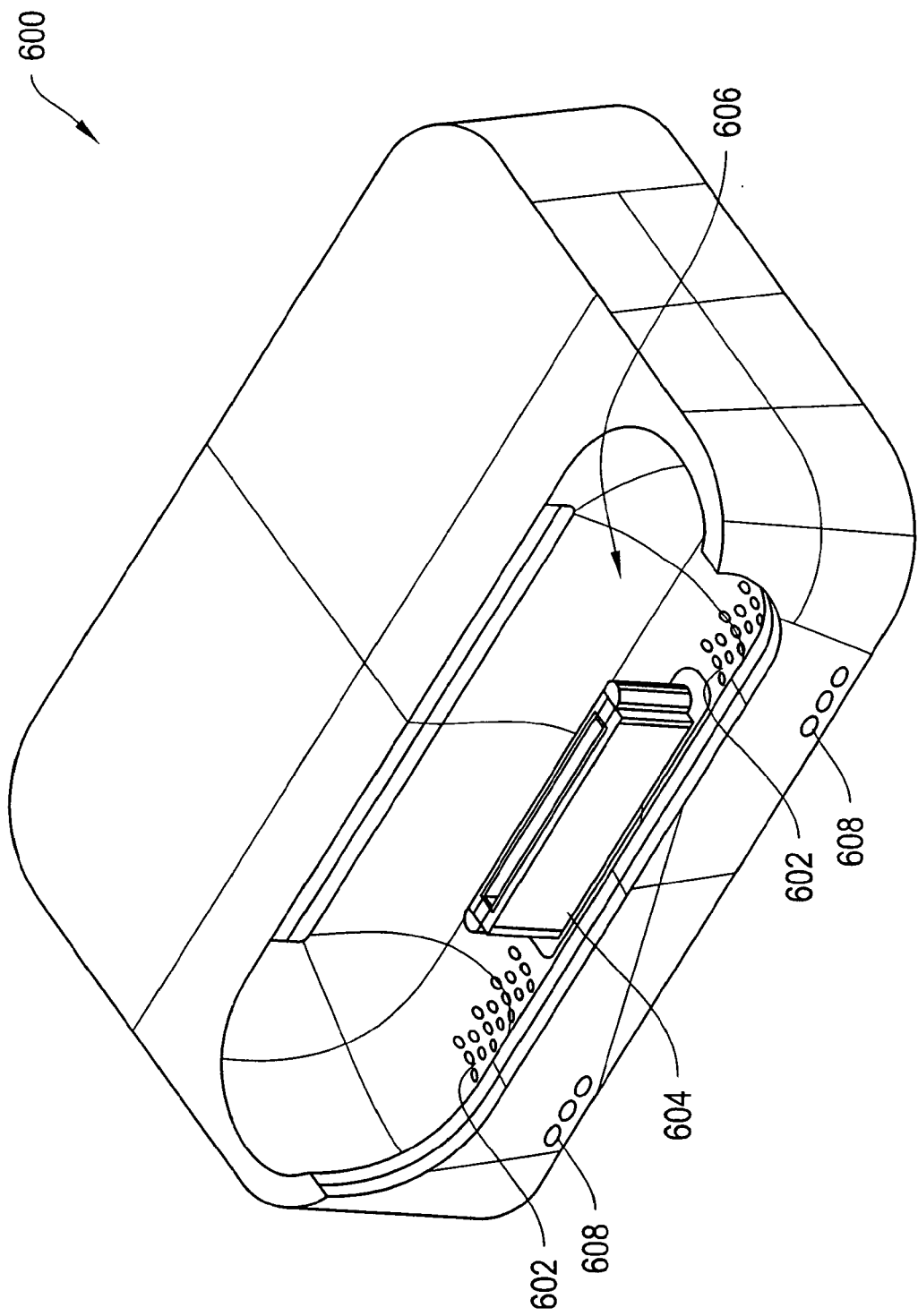

PERSONAL MEDIA DEVICE DOCKING STATION HAVING AN ACCESSORY DEVICE DETECTOR

CROSS-REFERENCE TO RELATED APPLICATION

This is a continuation of commonly-assigned U.S. patent application Ser. No. 11/810,171, filed Jun. 5, 2007, now U.S. Pat. No. 7,840,740, which is fully incorporated herein by reference.

BACKGROUND

This invention relates to docking stations for personal media devices and, more particularly, to docking stations having an accessory device detector.

The proliferation of compact portable personal media devices (e.g., portable MP3 players, portable video players, and media capable cellular telephones) has created a need for improved delivery of audio (e.g., voice and music) to users while respecting the need to minimize the overall form factor of personal media devices. Many portable personal media devices can be detachably mounted to or interfaced with a docking station, which may include a platform, support structure, electrical connector, or device holding mechanism, to enable convenient and efficient positioning, storing, and interfacing with other devices. A docking station may position the media device in a functionally more efficient or aesthetically pleasing position, secure the media device, or enable charging of a battery of the media device.

Existing media device docking stations typically have a structure that can interfere with or block the reception or delivery of sound to or from the media device. By interfering with or muffling the transmission of sound, the docking station reduces the sound quality received or transmitted by the media device. Other docking stations may support the delivery of audio signals from the personal media device to another accessory device or to speakers that are connected to docking station. The accessory media supporting device or speakers then produce sound from the audio signals for the personal media device user.

One problem with existing media device docking stations is that the docking stations do not efficiently provide an indication to the personal media device of whether an accessory device, such as a media supporting device, is connected to the docking station or that the accessory device is capable of receiving an audio signal to support the delivery of sound to the user or other data signals.

SUMMARY

The invention, in various embodiments, addresses deficiencies in the prior art by providing systems, methods and devices that enable a docking station to efficiently inform a docked media device that one or more accessory media supporting devices are attached to the docking station and are capable of processing certain data signals, e.g., audio signals, originating from the personal media device.

In various aspects, the invention includes a circuit for detecting the insertion of a component of an electronic system, e.g., an audio plug or jack. When the component is inserted into the docking station, an electronic switch can be opened. When the switch is opened, a detector (e.g., mono stable multivibrator) for detecting a change in state of the switch can be activated. Responsive to the detected change in state, the detector can issue a signal (see ACC_DETECT in attached FIG. 13A) to a control device. Responsive to the signal, the controller can look to a resistive identification circuit or network and, based on its resistance (see ACC_ID in attached FIG. 13A), determine whether the component has just been inserted or removed from the system.

In another aspect, a docking device includes a first connector for exchanging data with a media device, one or more second connectors for delivering data to a media supporting device, and one or more sensors for detecting when the media supporting device is connected to the one or more second connectors. The device may include at least one sensor having an indicator to inform the media device when the media supporting device is connected to the one or more second connectors. In one configuration, the indicator informs the media device by sending an indicator signal via the first connector to the media device.

The device sensor may include a switch whose position changes in response to the attachment of a data connector with at least one of the second connectors. In one configuration, the switch position changes in response to the attachment of a data connector with at least one of the second connectors. In another configuration, the sensor includes a resistive network that changes resistive value in response to a change in position of the switch. In one feature, the media device is in communication with the resistive network via the first connector.

In one configuration, the media device determines that the media supporting device is connected to the docking device by measuring a resistive value associated with a resistive network. The value may be a resistance, current, or voltage value. The value may be associated with a type of media supporting device.

In another configuration, one or more sensors are able to detect when a media supporting device is disconnected from one or more of the second connectors respectively. The sensor may include a multivibrator circuit such as a monostable multivibrator. The sensor may be positioned within the device housing at a location to minimize radio frequency interference with a docked media device. In one configuration, the first connector and sensor are connected via an bus within the housing where the bus is routed along a PCB to minimize radio frequency interference with the media device.

The media device may include at least one of an MP3 player, video player, wireless communications device, cellular telephone, multimedia device, personal digital assistant, and portable computer. The media supporting device or accessory media device may include at least one of a video display, a computer, a stereo system, audio speaker system, radio receiver, set top box, television, digital video recorder, digital video source, audio signal source, and a media device.

In another aspect, a docking station includes a well for receiving and supporting an electronic device, a first connector for receiving audio signals from the electronic device, a second connector for sending the audio signals from the docking station to an accessory media device, and a sensor circuit for detecting when the accessory media device is attached to or detached from the second connector. In response to the attachment or detachment, the sensor circuit may send a connection event signal to the electronic device via the first connector.

The sensor circuit may adjust the value of a resistive network to a first resistive value when the accessory media device is attached to the second connector or to a second resistive value when the accessory media device is not attached to the second connector. The docking station may provide the value of the resistive network to the electronic device via the first connector.

Various advantages and applications using an audio interface within a docking station in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIG. 6A shows a perspective view of a docking station including a acoustic apertures and an electronic connector according to an illustrative embodiment of the invention;

DETAILED DESCRIPTION OF THE DISCLOSURE

Figure 1:
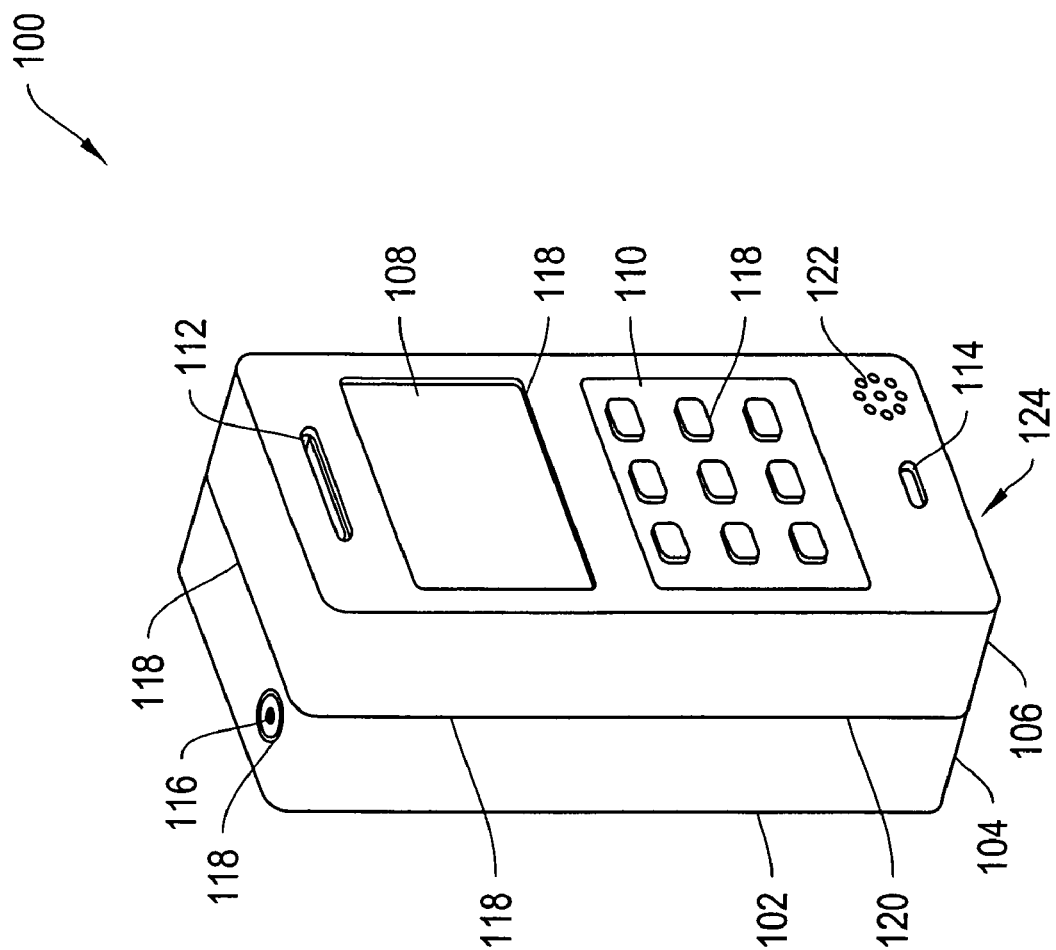
FIG. 1 is a perspective view of a media device according to an illustrative embodiment of the invention.

FIG. 1 is a perspective view of a media device 100 according to an illustrative embodiment of the invention. The media device 100 includes a housing 102, a first housing portion 104, a second housing portion 106, a display 108, a keypad 110, a speaker housing aperture 112, a microphone aperture 114, and a headphone jack 116. The housing 102 also includes various gaps 118 that may include openings, separations, vents, or other pathways between elements of the housing 102 that enable the passage of air or sound through the housing 102. The speaker housing aperture 112 may be located in proximity to a lower portion of the media device 100 and/or a second speaker aperture or apertures 122 may be located in a lower portion of the media device associated with, for example, an internal hands-free speaker. In certain embodiments, the microphone aperture 114 and/or speaker apertures 122 may be located on a bottom side 124 of the media device 100. The aperture 114 and apertures 122 may be located on any portion of the housing 102 to facilitate the delivery and reception of sound.

In one embodiment, the housing 102 includes a first housing portion 104 and a second housing portion 106 that are fastened together to encase various components of the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, one or more circuit boards having integrated circuit components, internal radio frequency (RF) circuitry, an internal antenna, a speaker, a microphone, a hard drive, a processor, and other components. Further details regarding certain internal components are discussed later with respect to FIG. 3. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may including one or more housing apertures 114 to facilitate the reception of sounds, such as voice, for an internal microphone from a media device user.

In certain embodiments, the housing 102 includes one or more gaps 118 associated with the housing 102. These gaps 118 may result from the manufacturing and/or assembly process for the media device 100. For example, in certain circumstances, the mechanical attachment of the first housing portion 104 with the second housing portion 106 results in a crease 120 or joint between the portions 104 and 106. In certain media devices 100, the crease 120 is not air tight, resulting in gaps 118 along the crease. Other gaps may be formed during assembly between, for example, one or more keys of the keypad 110 and the housing 102 or the display 108 and the housing 102, resulting in additional gaps 118. In other embodiments, the housing 102 may include addition portions that are integrated to form the housing 102 for the media device 100.

The media device 100 may include a wireless communications device such as a cellular telephone, satellite telephone, cordless telephone, personal digital assistant (PDA), pager, portable computer, or any other device capable of wireless communications. In fact, FIG. 1 shows an exemplary cellular telephone version of a broad category of media device 100.

The media device 100 may also be integrated within the packaging of other devices or structures such a vehicle, video game system, appliance, clothing, helmet, glasses, wearable apparel, stereo system, entertainment system, or other portable devices. In certain embodiments, device 100 may be docked or connected to a wireless enabling accessory system (e.g., a wi-fi docking system) that provides the media device 100 with short-range communicating functionality. Alternative types of media devices 100 may include, for example, a media player such as an iPod or iPhone available by Apple Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the media device 100 may synchronize with, for example, a remote computing system or server to receive media (using either wireless or wireline communications paths). Wireless syncing enables the media device 100 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the media device 100. In certain embodiments, media and/or data is "downloaded" to the media device 100. In other embodiments, the media device 100 is capable of uploading media to a remote host or other client system. Further details regarding the capabilities of certain embodiments of the media device 100 are provided in U.S. patent application Ser. No. 10/423,490, filed on Apr. 25, 2003, the entire contents of which are incorporated herein by reference.

Figure 2:
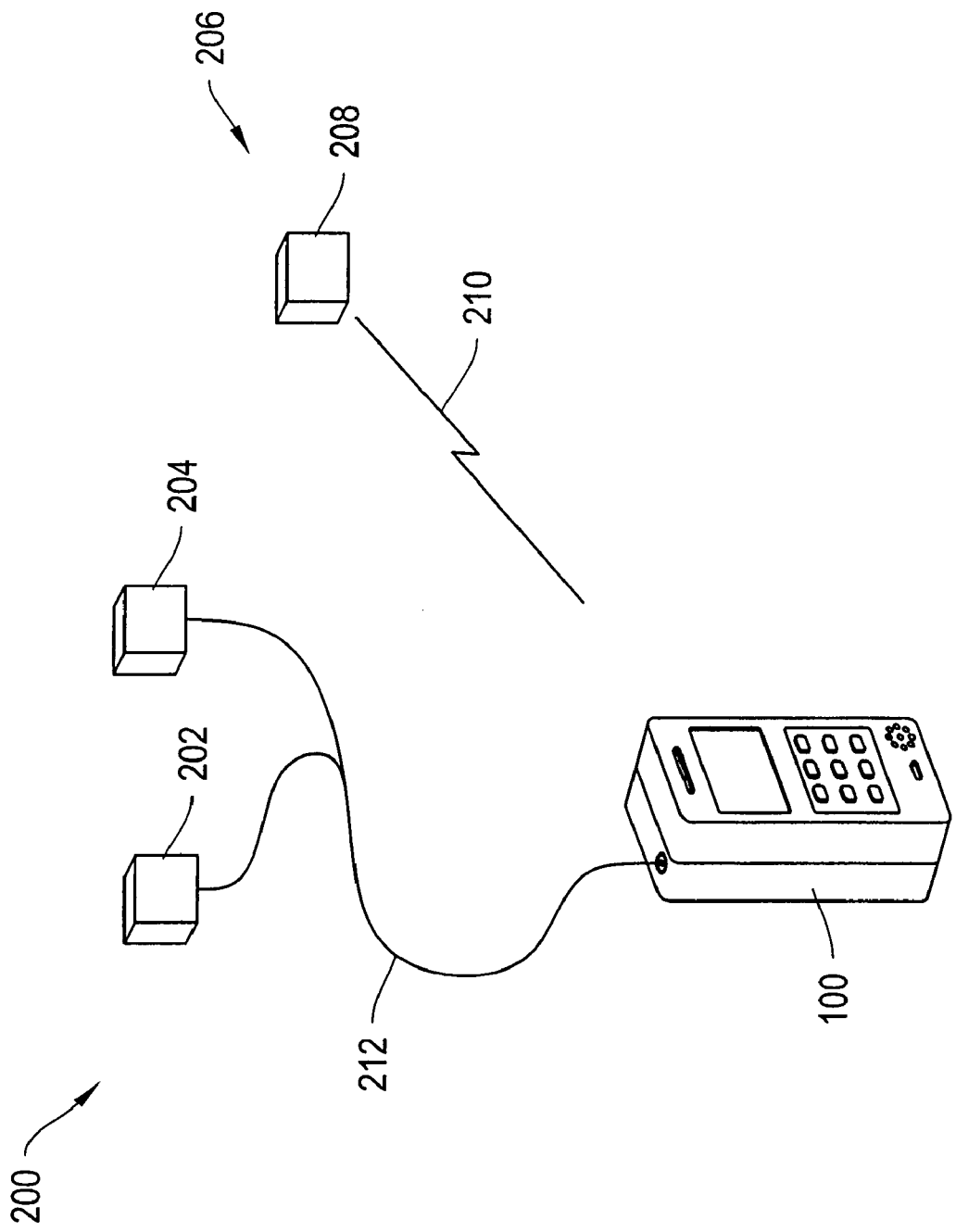
FIG. 2 shows the media device of FIG. 1 with tethered headphones and, alternatively, a wireless earpiece according to an illustrative embodiment of the invention.

FIG. 2 shows the media device 100 of FIG. 1 with tethered headphones 200 and, alternatively, a wireless earpiece 206 according to an illustrative embodiment of the invention. The tethered headphones 200 include a cable 212 that connects to the media device 100 via external jack 116. In one embodiment, the cable provides for transport of an audio signal from the media device 100 to the headphones 100. In another embodiment, the headphones 200 includes a left housing 202 and a right housing 204, corresponding to the left and right ears of a user, respectively. Each housing 202 and 204 may include a speaker and/or an acoustic assembly as described later with respect to FIG. 4. The headphones 200 may optionally include a microphone to facilitate sending sounds from the user to the media device 100. As an alternative to the headphones 200, a user may utilize the wireless earpiece 206 which includes a housing 208. In one embodiment, the earpiece 206 employs wireless channel 210 to receive audio signals from the device 100 or transmit audio signals to the device 100. The housing 208 may include a speaker, microphone, and/or acoustic assembly as described later with respect to FIG. 4.

Figure 3:
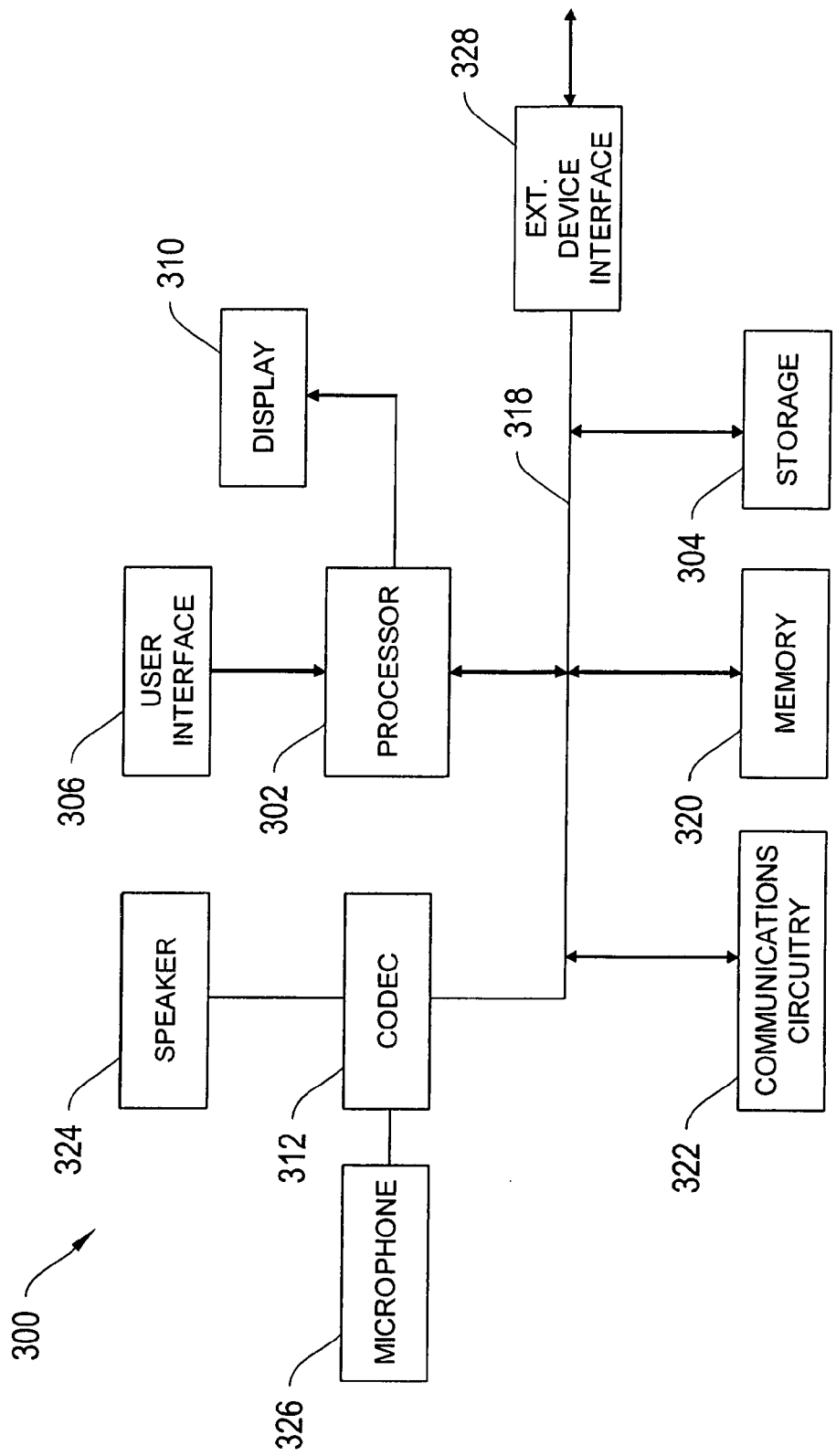
FIG. 3 shows a simplified functional block diagram of a media device according to an illustrative embodiment of the invention.

FIG. 3 shows a simplified functional block diagram of the media device 100 according to an illustrative embodiment of the invention. The media device or player 300 may include a processor 302, storage device 304, user interface 308, display 310, CODEC 312, bus 318, memory 320, communications circuitry 322, a speaker or transducer 324, a microphone 326, and an external device interface 328. Processor 302 may control the operation of many functions and other circuitry included in media player 300. Processor 302 may drive display 310 and may receive user inputs from user interface 308.

The interface 328 may include at least one of a modem, data port, and connector to enable the media device 300 to send, receive, or exchange data with another media device or media supporting device. For example, the interface 328 may include a 30-pin connector having left and right audio output data pins that support the delivery of stereo audio signals to a docking device or other media device. The interface 328 may support full USB and or USB 2.0 connectivity, Firewire charging, Firewire charging with TPA+ connected for supporting "Firewire Not Supported" UI messaging, and other like peripheral device communication protocols.

Storage device 304 may store media (e.g., music and video files), software (e.g., for implanting functions on device 300, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps tracks of podcasts or television shows or other media a user subscribes to), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 112 may be included to convert digital audio signals into an analog signal for driving the speaker 324 to produce sound including voice, music, and other like audio. The CODEC 112 may also convert audio inputs from the microphone 326 into digital audio signals.

User interface 308 may allow a user to interact with the media device 300. For example, the user input device 308 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocols standards could also be used, either in alternative to the identified protocols or in addition to the identified protocol. Other network standards may include Bluetooth, the Global System for Mobile Communications (GSM), and code divisional multiple access (CDMA) based wireless protocols. Communications circuitry 322 may also include circuitry that enables device 300 to be electrically coupled to another device (e.g., a computer or an accessory device) and communicate with that other device.

In one embodiment, the media device 300 may be a portable computing device dedicated to processing media such as audio and video. For example, media device 300 may be a media player (e.g., MP3 player), a game player, a remote controller, a portable communication device, a remote ordering interface, an audio tour player, or other suitable personal device. The media device 300 may be battery-operated and highly portable so as to allow a user to listen to music, play games or video, record video or take pictures, communicate with others, and/or control other devices. In addition, the media device 300 may be sized such that is fits relatively easily into a pocket or hand of the user. By being handheld, the media device 300 (or media device 100 shown in FIG. 1) is relatively small and easily handled and utilized by its user and thus may be taken practically anywhere the user travels.

As discussed previously, the relatively small form factor of certain prior art media devices has facilitated the use of docking stations to support a media device during storage or when the device is interfacing with another device such as a PC or power source. While supporting the media device 100, the docking station or unit may, however, inhibit the flow of sound to and from the media device 100 and, thereby, reduce the quality of sound emitted from or delivered to the docked media device 100. Accordingly, embodiments of the invention provide for enhanced sound quality while a media device 100 is docked to a docking station by enhancing the flow of sound using one or more acoustic interfaces within the docking station.

Figure 4:
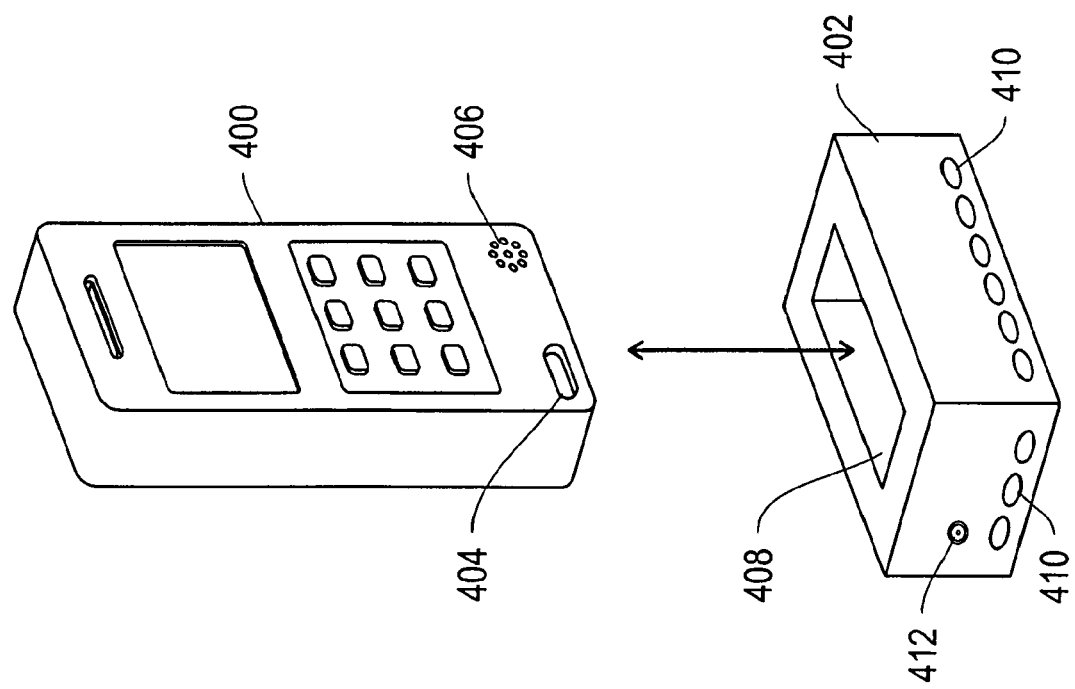
FIG. 4 shows an exploded view of media device and associated docking station according to an illustrative embodiment of the invention.

FIG. 4 shows an exploded view of media device 400 and associated docking station 402 according to an illustrative embodiment of the invention. In one embodiment, the media device includes at least one microphone aperture 404 and one or more speaker apertures 406. The docking station 402 may include a well 408 and one or more external acoustic apertures 410. In one embodiment, the one or more of the acoustic apertures 410 are in acoustic communication with the either or both the microphone aperture 404 and the speaker apertures 406 of the media device 400 when the media device 400 is docked with the docking station 402. In certain embodiments, the docking station 402 includes internal acoustic channels (not shown) and internal acoustic apertures (not shown) along the well walls that are juxtaposed with one or both of the microphone aperture 404 and speaker apertures 406 while the media device 400 is docked with the docking station 402.

In other embodiments, the docking station 402 includes an audio output jack receptacle or connector 412 that enable the docking station 402 to connect with a media supporting device via an audio jack or plug in addition to the media device 400. In one embodiment, the media supporting device includes stereo speakers configured to receive left and right stereo audio signals originating from the media device 400 and that are routed through the docking station 402 to the audio output jack 412. Although not shown in FIG. 4, the well 408 may include a connector, such as connector 604 of FIG. 6, that enables the routing of audio signals from the personal media device 400 to the docking unit 402, which may subsequently be delivered to a peripheral media supporting device via the audio output jack receptacle 412. The docking station 402 may include one or more other types of data ports or connector such as, without limitation, a video output port, video input port, Ethernet port, wireless data port, audio input port, and like data exchange ports or connectors.

In operation while the media device 400 is docked, sound emitted from the speaker apertures 406 is coupled via one or more internal acoustic channels of the docking station 402 and through one or more external acoustic apertures 410 to the surrounding environment. In another embodiment, while the media device 400 is docked, sound received by the microphone apertures 404 is coupled via one or more internal acoustic channels of the docking station 402 from one or more external acoustic apertures 410.

The shape and orientation of docking station 402 may vary based on aesthetic and function needs. For example, the docking station may be substantially rectangular, spherical, circular, or irregular, or the like. The external acoustic apertures may be grouped, arranged, configured, and/or distributed in various ways along the external surface or perimeter of the docking station 402. For example, the external acoustic apertures 410 may be arranged in one or more rows along a front, side, and/or back surface of the docking station 402. The external acoustic apertures 410 may be arranged in patterns such as circularly, diagonally, and/or rectangularly along the outer surface of the docking station 402. The docking station 402 may interface with or be juxtaposed with any portion of the media device 400 while the media device 400 is docked. For example, the docking station 402 may function as a holster that enables the media device 400 to detachably connect to the docking station 402. The docking station 402 may have a substantially downward facing well 408 such that the media device 400 is detachably connected with the docking station or hung from the docketing station 402 via an upper portion of the media device 400. While the docking station 402 may assume any one of a multitude of forms and orientations, the docking station 402 may include one or more acoustic channels and apertures 410 that facilitate the efficient transfer of sound to and from the media device 400 while the media device 400 is docked. In certain embodiments, the docking station 402 may include a media device receiver to enable a media device 400 to be detachably connected to the docking station 402. The media device 400 receiver may include at least one of a well 408, a clamp, an adhesive, a mechanical connector, an electrical connector, and/or a combined mechanical/electrical connector.

Figure 5:
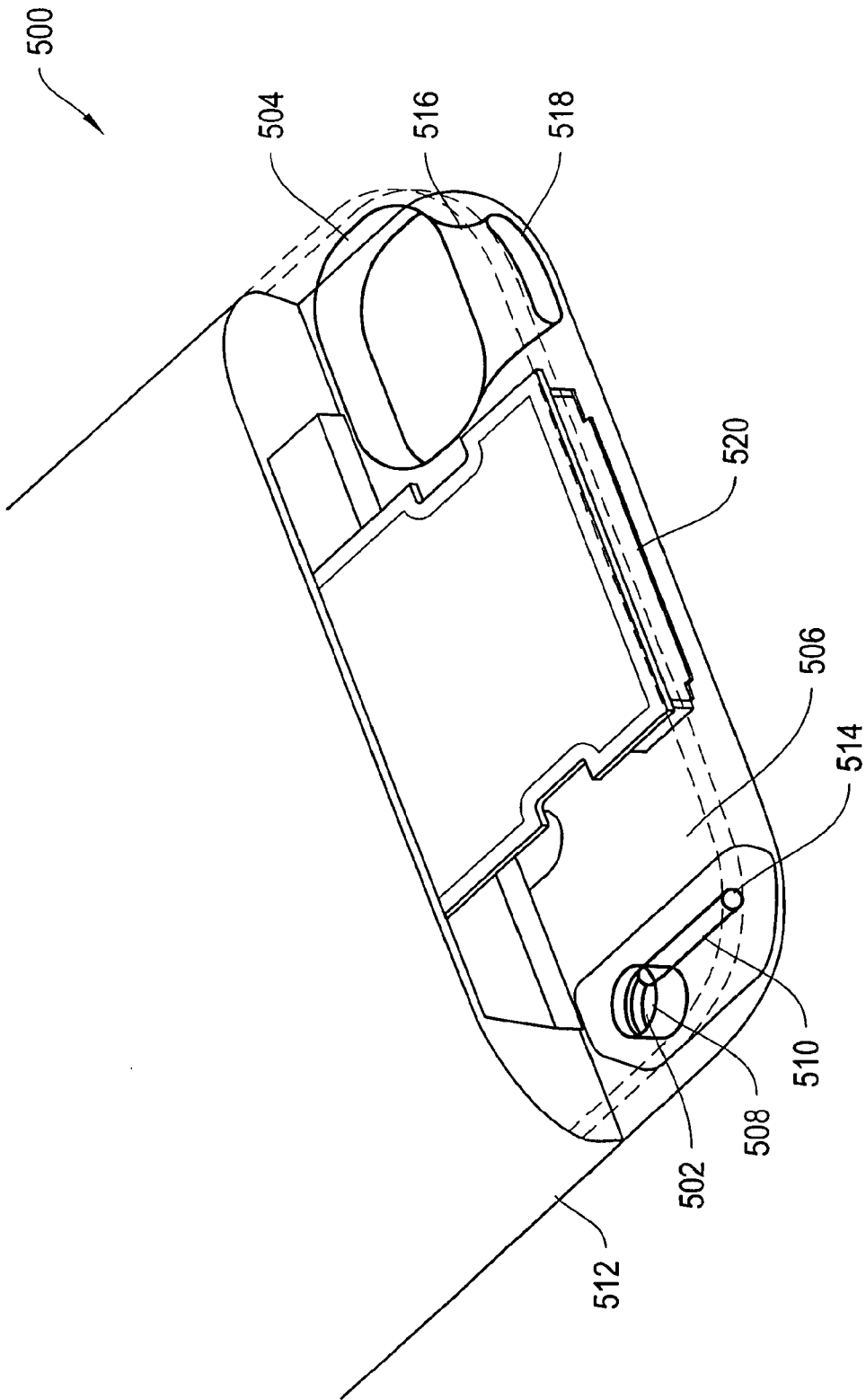
FIG. 5 shows a perspective view of a microphone assembly and speaker assembly within a portion of a media device according to an illustrative embodiment of the invention.

FIG. 5 shows a perspective view of a microphone assembly cavity 502 and speaker cavity 504 within a portion of a media device 500 according to an illustrative embodiment of the invention. The media device 500 includes frame 506, a frame recess 508, an microphone acoustic channel 510, a housing 512, a sound input aperture 514, a speaker acoustic channel 516, and a sound output aperture 518.

In one embodiment, the cavity 502 is configured to receive and/or enable the mounting of a microphone assembly. The microphone assembly may include a rubber boot that surrounds a portion of the microphone assembly and extends along a portion of the acoustic channel 510. The acoustic channel length may be between 14-15 mm long to optimally couple sound in the 100 Hz to 4 KHz range from the aperture 514 to the microphone assembly disposed in the microphone assembly cavity 502. In one embodiment, the recess 508 enables the mounting of a microphone assembly on the top surface of the frame 506. In another embodiment, the microphone assembly cavity 502 is positioned on the frame 506 to flexibly allow other components such as, for example, an antenna to be positioned in close proximity to the bottom of the media device 500.

In one embodiment, the sound input aperture 514 is located substantially along a bottom portion of the media device 500. In another embodiment, the sound output aperture 518 is located substantially along a bottom portion of the media device 500. In other embodiments, the one or more sound input or output apertures are location along any portion of the media device 500. In one embodiment, the media device 500 includes a receptacle 520 for detachably connecting the media device 500 to a docking station or other connector.

FIG. 6A shows a perspective view of a docking station 600 including internal acoustic apertures 602 and an electronic connector 604 according to an illustrative embodiment of the invention. In one embodiment, the internal acoustic apertures 602 and connector 604 are located within a well 606 of the docking station 600. The docking station 600 may include one or more external acoustic apertures 608 that are in acoustic communication with the internal acoustic apertures 602 via one or more acoustic channels (not shown) within the docking station 600. The male connector 604 may interface or connect with a female connector such as connector 520 shown in FIG. 5. In one embodiment, the connector 604 is a 30-pin connector including data pins that support, without limitation, the exchange of audio signals, video signals, control signals, data signals, and the like. For example, the connector 604 may include pins, contacts, or data connectors that support left audio, right audio, and ground, respectively, to support the delivery of stereo audio signals to an external media supporting device, e.g., device including stereo speakers. The well 606 may be configured and/or shaped to conform with the shape of a media device such as, for example, media device 500 of FIG. 5.

In one embodiment, the one or more acoustic apertures 602 are positioned substantially adjacent to or juxtaposed with one or more acoustic apertures of a docked media device. For example, the docking station 600 apertures 602 may be positioned adjacent to the sound input aperture 514 of the media device 500 while the media device 500 is docked with the docking station 600. Also, the docking station 600 apertures 602 may be positioned adjacent to the sound output aperture 518 of the media device 500 while the media device 500 is docked with the docking station 600. By positioning the docking station 600 apertures 602 in proximity to the acoustic apertures 514 and 518 of the docked media device 500, the docking station 600 facilitates the flow of sound waves to and from the media device 500 via the docking station apertures 602.

Figure 6B:
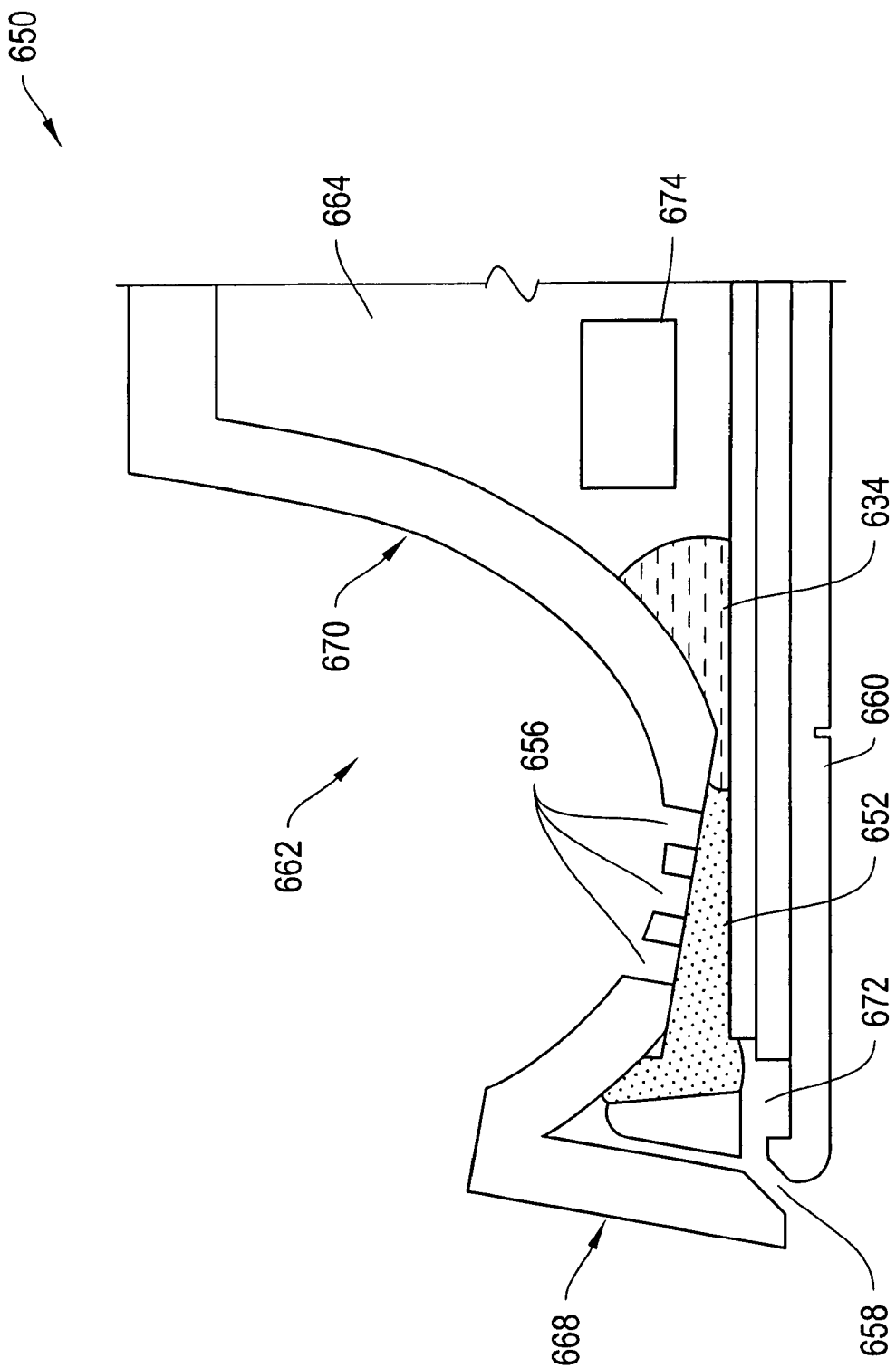
FIG. 6B shows a transverse-sectional view of a docking station including a acoustic apertures and an insulator according to an illustrative embodiment of the invention.

FIG. 6B shows a transverse-sectional view of a docking station 650 including a acoustic apertures 656 and 658 and insulators 652 and 654 according to an illustrative embodiment of the invention. The docking station 650 includes a well 662 having a well surface 670, a front surface 668, one or more external apertures 658, one or more internal apertures 656, a housing 664, one or more acoustic channels 672, one or more insulators 652 and 654, and a base 660. The insulators 652 and 654 may include foam, polymer, or a like insulating material. The insulator 652 may be positioned inside the housing 664 and between a first set of acoustic channels 672 that transport sound toward a microphone of a media device docked in the well 662 and a second set of acoustic channels 672 that transport sound away from a speaker of a media device docked in the well 662. The insulators 652 and 654 can reduce the coupling of sound or cross-talk between the acoustic channels to reduce possible feedback from the speaker to the microphone of a docked media device. The insulators 652 and 654 may also provide structural support for the housing 664. The docking station 650 may include an internal circuit assembly 674. The circuit assembly 674 may include one or more circuit boards. One or more of the circuit boards may be multilayered. The circuit assembly 674 may include a sensor circuit, such a sensor circuit 1302 of FIG. 13. The circuit assembly 674 may be positioned or located within a portion of the docking station housing 664 in such a way as to minimize potential radio frequency (RF) interference between the components of the circuit assembly 674 and an antenna or circuitry of a docked personal media device.

In one embodiment, a first set of internal acoustic apertures 656 are coupled to the first set of acoustic channels 672 while a second set of internal acoustic apertures 656 are coupled to a second set of acoustic channels 672. In another embodiment, the external aperture 658 includes a plurality of apertures or openings between the base 660 and surface 668 of the housing 664. In one embodiment, a first set of external apertures 658 is coupled to the first set of acoustic channels 672 while a second set of external acoustic apertures are coupled to the second set of acoustic channels.

Figure 7:
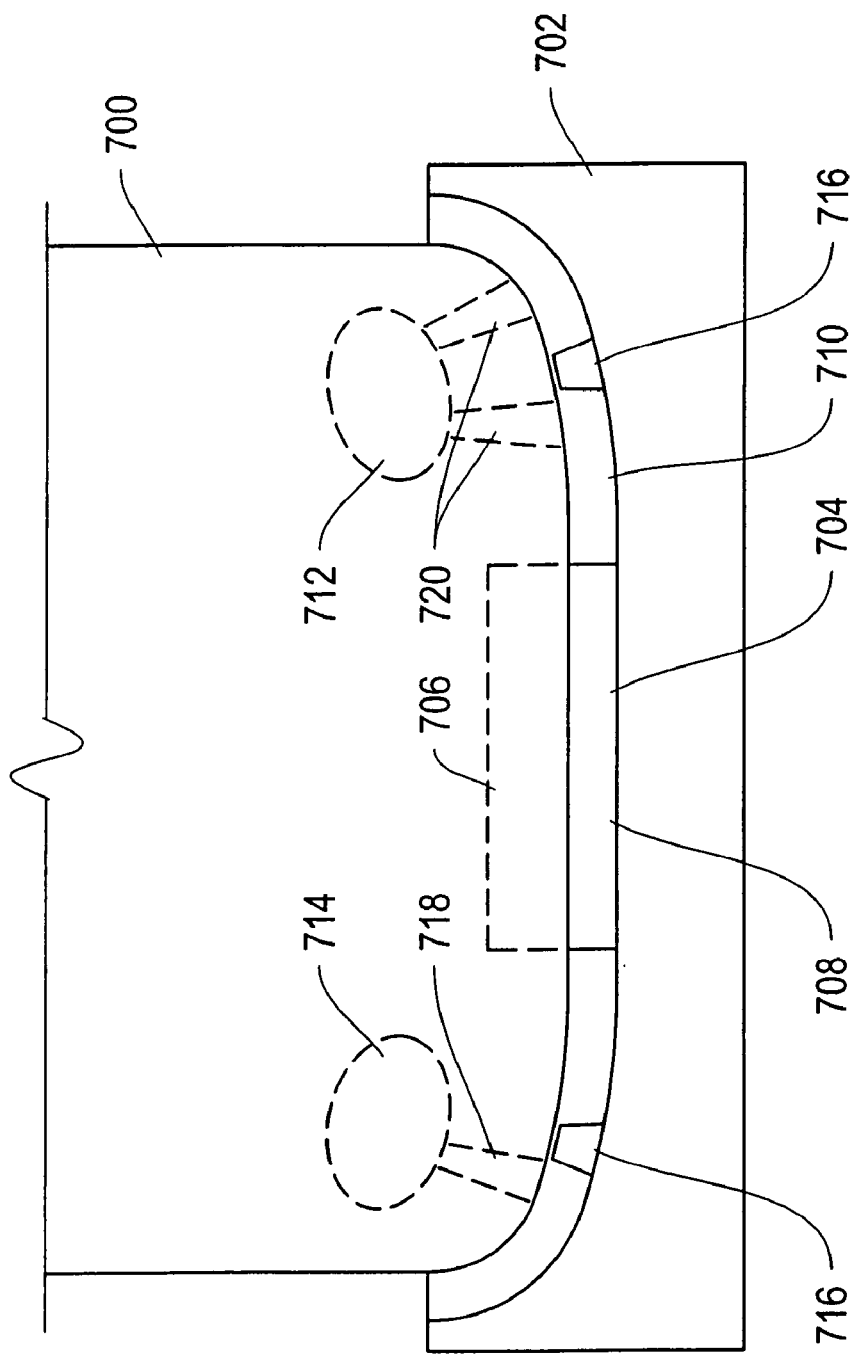
FIG. 7 shows a cross-sectional view of a portion of a media device that is docked to a docking station according to an illustrative embodiment of the invention.

FIG. 7 shows a cross-sectional view of a portion of a media device 700 that is docked to a docking station 702 according to an illustrative embodiment of the invention. In one embodiment, the docking station 702 includes a connector 704 that physically and/or electronically connects with the media device 700. The connector 704 may be a male connector with a portion 706 that extends into a connector of the media device 700 and a portion 708 that does not extend into the media device 700. The length of the portion 708 may define the width of a gap 710 between the media device 700 and the docking station 702. In one embodiment, the gap 710 provides an acoustic pathway or channel that enables the more efficient transfer of sound to and from the media device 700. The gap 710 may also provide pressure relief to reduce the likelihood of feedback from the speaker 712 which could interfere with the reception of sound by the microphone 714. The docking station 702 may also include one or more spacers 716 that establish the gap 710 between the media device 700 and docking station 702. The media device 700 may include a microphone channel 718 and/or one or more speaker channels 720.

Figure 8:
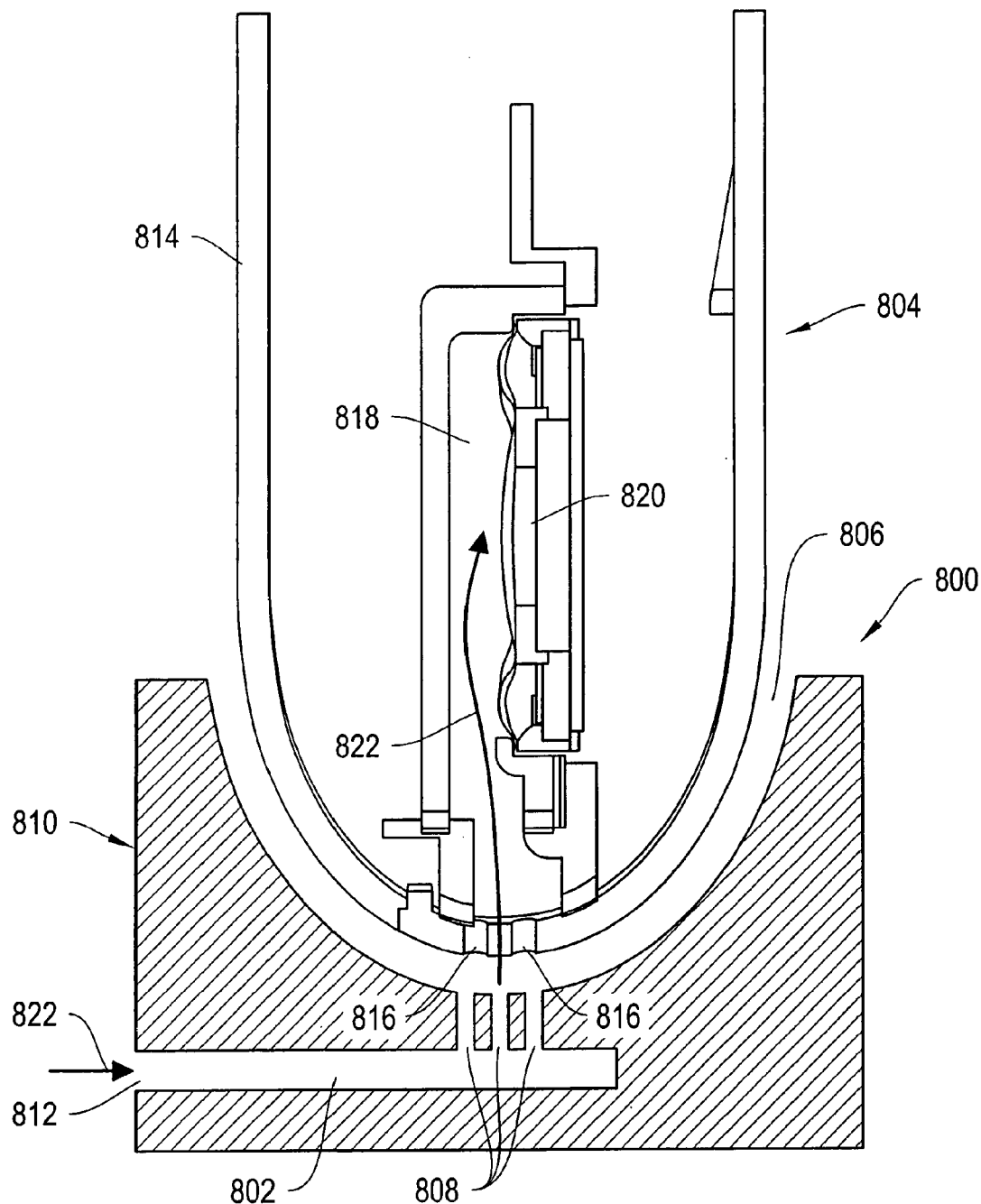
FIG. 8 shows a transverse-sectional view of an acoustic channel within a docking station for the delivery of sound to a portion of a docked media device according to an illustrative embodiment of the invention.

FIG. 8 shows a transverse-sectional view of an acoustic channel 802 within a docking station 800 for the delivery of sound to a portion of a docked media device 804 according to an illustrative embodiment of the invention. The docking station 800 may include a well 806, internal acoustic apertures 808, an external front surface 810, and one or more external apertures 812. Although not shown in FIG. 8, the docking station or unit 800 may include an electrical connector, such as connector 604 of FIG. 6, to which the media device 804 detachably connects while docked with the docking station 800.

The media device 804 may include a housing 814, microphone apertures 816, an internal microphone acoustic channel 818, and a microphone assembly 820. Although not shown in FIG. 8, the media device 804 may include an electrical receptacle, such as receptacle 520 of FIG. 5, to which the docking station 800 detachably connects while the media device 804 is docked or held by the docking station 804.

In operation, sound 822 is received by the docking station 800 via at least one aperture 812 on the front surface 810 of the docking station 800. The sound 822 travels along one or more acoustic channels 802 toward the internal acoustic apertures 808, positioned along a wall of the well 806. The internal apertures 808 are preferably positioned in relatively close proximity with the microphone apertures 816 of the media device 804 to enhance the coupling of sound from the docking station 800 to the media device 804. The sound 822 passes through the apertures 816 into the microphone acoustic channel 818 and is received by the microphone assembly 820. The microphone assembly 820 includes a microphone that converts the received sound 822 into electrical information for the media device 804 to process further.

The docking station 800 may include a plurality of acoustic channels 802 where each acoustic channel 802 is associated with its own external aperture 812 and internal aperture 808. Alternatively, a portion of the acoustic channels 802 may be inter-connected. While sound 822 is shown as flowing into the acoustic channel 802 from the aperture 812, the acoustic channel 802 may also support the flow of sound 822 or sound waves in an opposite direction and out of the aperture 812. Thus, a portion of the acoustic channels 802 may support sound flow in a bi-directional manner. The docking station may consist of plastic or some other polymer and be formed by molding, pressing, casting or some other known manufacturing process. The docking station may include other materials such as one or more metals. The apertures and acoustic channels may be formed or manufactured by a process including machining, punching, casting, molding, pressing, and/or assembling.

Figure 9:
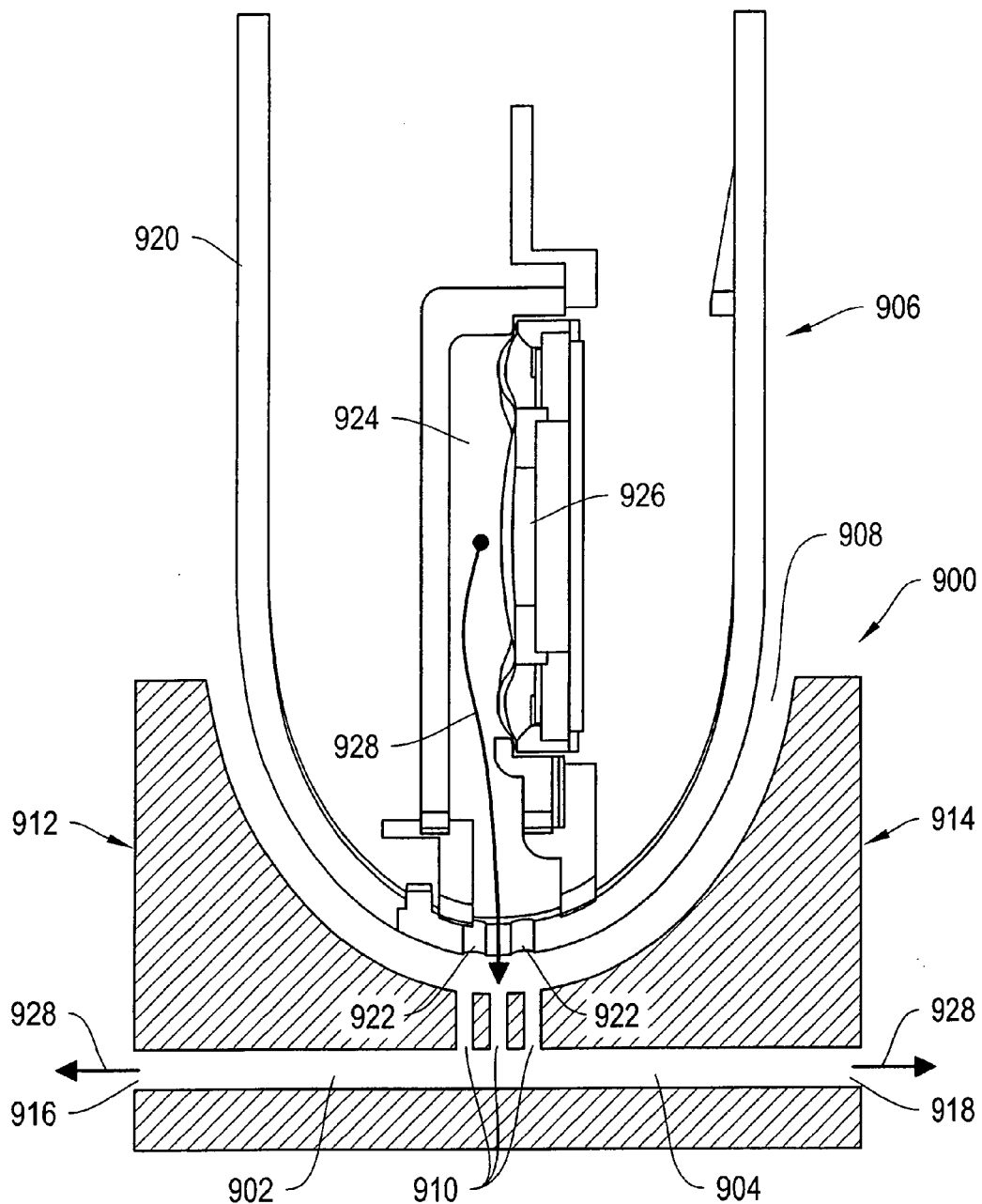
FIG. 9 shows a transverse-sectional view of acoustic channels within a docking station for the delivery of sound from a portion of a docked media device according to an illustrative embodiment of the invention.

FIG. 9 shows a transverse-sectional view of acoustic channels 902 and 904 within a docking station 900 for the delivery of sound from a portion of a docked media device 906 according to an illustrative embodiment of the invention. The docking station 900 may include a well 908, internal acoustic apertures 910, an external front surface 912, and external back surface 914, and one or more external apertures such as apertures 916 and 918. The external apertures 916 and 918 may be positioned on any external surface include side, bottom, top, front, back, or any externally facing surface. Although not shown in FIG. 9, the docking station or unit 900 may include an electrical connector, such as connector 604 of FIG. 6, to which the media device 904 detachably connects while docked with the docking station 900.

The media device 906 may include a housing 920, acoustic output apertures 922, an internal acoustic channel 924, and a speaker assembly 926. Although not shown in FIG. 9, the media device 906 may include an electrical receptacle, such as receptacle 520 of FIG. 5, to which the docking station 900 detachably connects while the media device 906 is docked or held by the docking station 900.

In operation, sound 928 is generated by the speaker assembly 926 and propagated through the channel 924 to the apertures 922. The sound 928 flows through the internal apertures 910 on the surface of the well 908 and into the acoustic channels 902 and 904 within the docking station 900. The docking station 900 emits the sound 928 from the acoustic channel 902 via the aperture 916 on the front surface 912. The docking station 900 may also emit sound 928 from the acoustic channel 904 via the aperture 918 on the back surface 914. In one embodiment, the acoustic channels 902 and 904 are interconnected. In another embodiment, the acoustic channels 902 and 904 are not interconnected. In one embodiment, acoustic channel 902 includes a plurality of acoustic channels that connects a plurality of internal apertures with a plurality of external apertures. In another embodiment, a portion of the plurality of acoustic channels are interconnected.

The internal apertures 910 are preferably positioned in relatively close proximity with the apertures 922 of the media device 906 to enhance the coupling of sound 928 from the media device 906 to the docking station 900. The speaker assembly 926 may include a speaker and/or one or more transducers or sound emitting mechanisms.

The docking station 900 may include a plurality of acoustic channels where each acoustic channel is associated with its own external aperture and internal aperture. Alternatively, a portion of the acoustic channels may be inter-connected. A portion of the acoustic channels 902 and 904 may support sound flow in a bi-directional manner.

Figure 10:
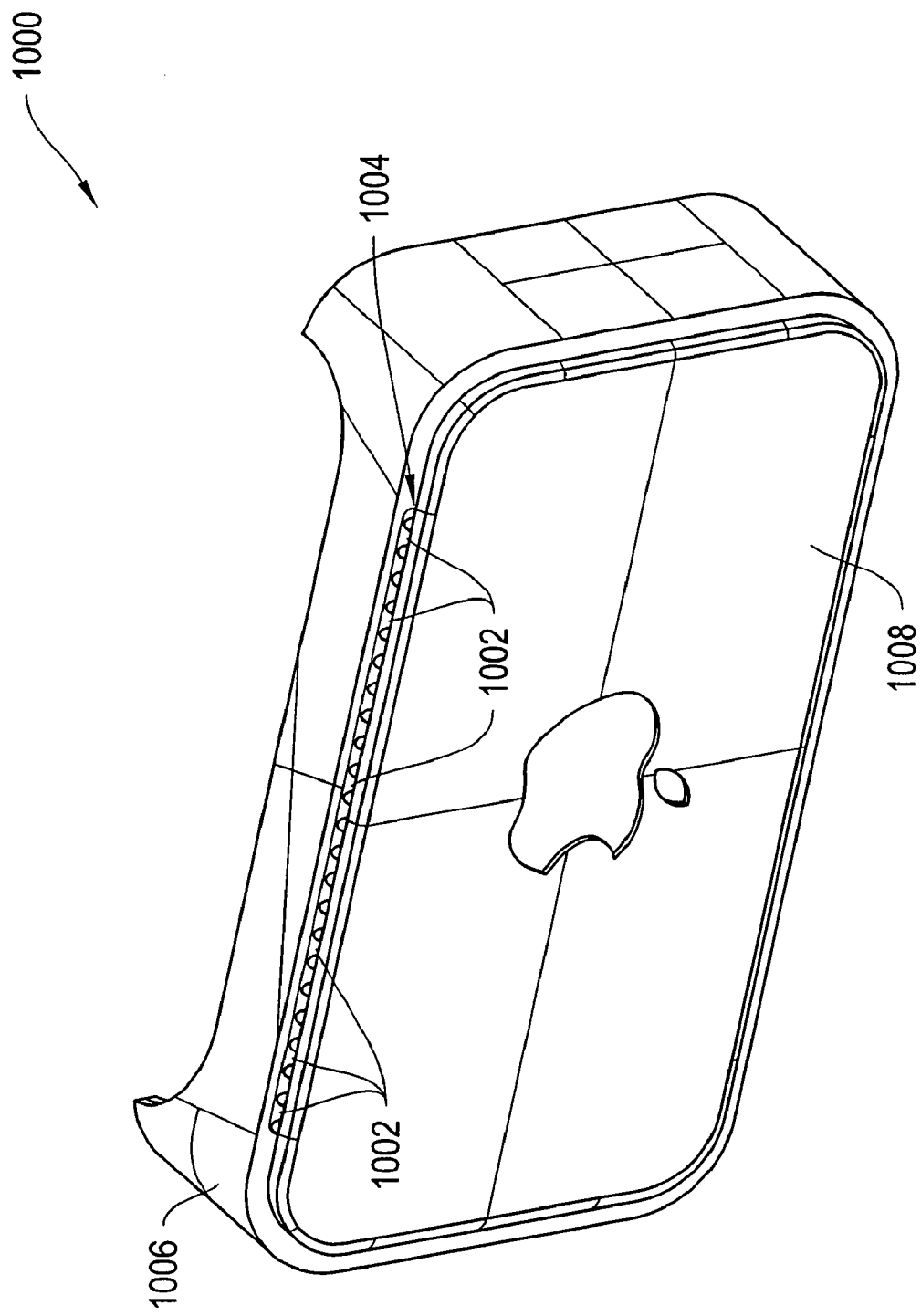
FIG. 10 shows a perspective view of a docking station including a plurality of external acoustic apertures according to an illustrative embodiment of the invention.

FIG. 10 shows a perspective view of a docking station 1000 including a plurality of external acoustic apertures 1002 according to an illustrative embodiment of the invention. In one embodiment, the external acoustic apertures 1002 are arranged in a slot 1004 that extends across the docking station 1000. Each of the external apertures 1002 may be interconnected by a common acoustic channel inside the docking station 1000. Alternatively, a portion of the apertures 1002 may be interconnected or each aperture 1002 may be associated with its own acoustic channel. In one embodiment, the external acoustic apertures 1002 are positioned along an inconspicuous lower portion of the docking station 1002 in order to save the surfaces of the docking station 1002 for other purposes such as, for example, an aesthetically pleasing design. In one embodiment, the external apertures 1002 are positioned at an interface between a housing wall 1006 at the front and/or bottom of the docking station 1000 and a foot member 1008 that supports the bottom of the docking station 1000 as it rests on a surface.

Figure 11:
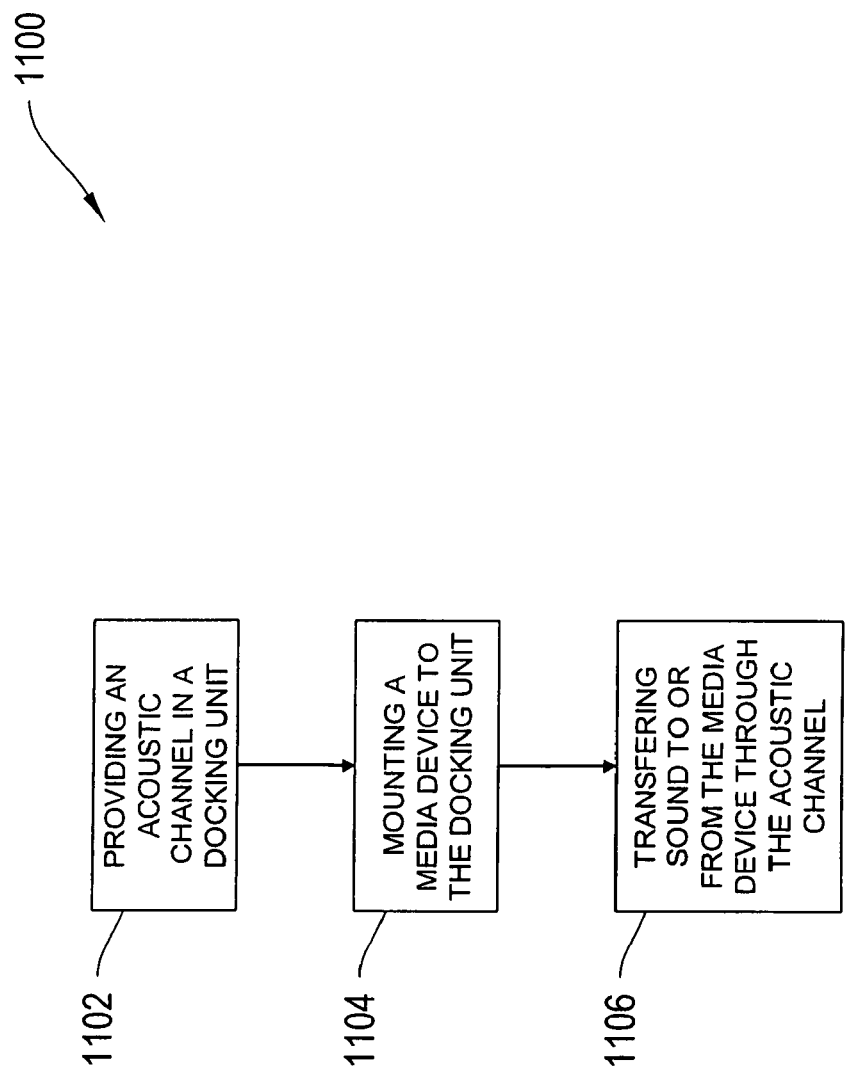
FIG. 11 is a flow chart of a process for transferring sound to or from a media device via an acoustic interface of a docking station according to an illustrative embodiment of the invention.

FIG. 11 is a flow chart of a process for transferring sound to or from a media device such as media device 100 via an acoustic interface or channel of a docking station according to an illustrative embodiment of the invention. First, an acoustic channel such a acoustic channel 902 of FIG. 9 is provided in a docking unit 900 (Step 1102). Then, a media device such as media device 906 is mounted to the docking unit 906 (Step 1104). Finally, sound is transferred to or from the media device 906 through the acoustic channel 902 to enable efficient transfer of sound while the media device 906 is docked to the docking station 900 (Step 1106).

In certain embodiments, a docking station or unit includes a sensor or sensor circuit that enables the docking station to detect the presence of a peripheral media supporting device other than the docked personal media device. The sensor circuit may also include an identification circuit that provides an indication or identification to the docked personal media device of the type of peripheral media supporting device that is attached to the docking station. For example, the identification circuit may indicate that the connected device is a audio supporting device. Based on the identification, the personal media device may route stereo audio signals to the docking station (via a docking station—media device connector) instead of routing the stereo audio signals to internal speakers.

Figure 12:
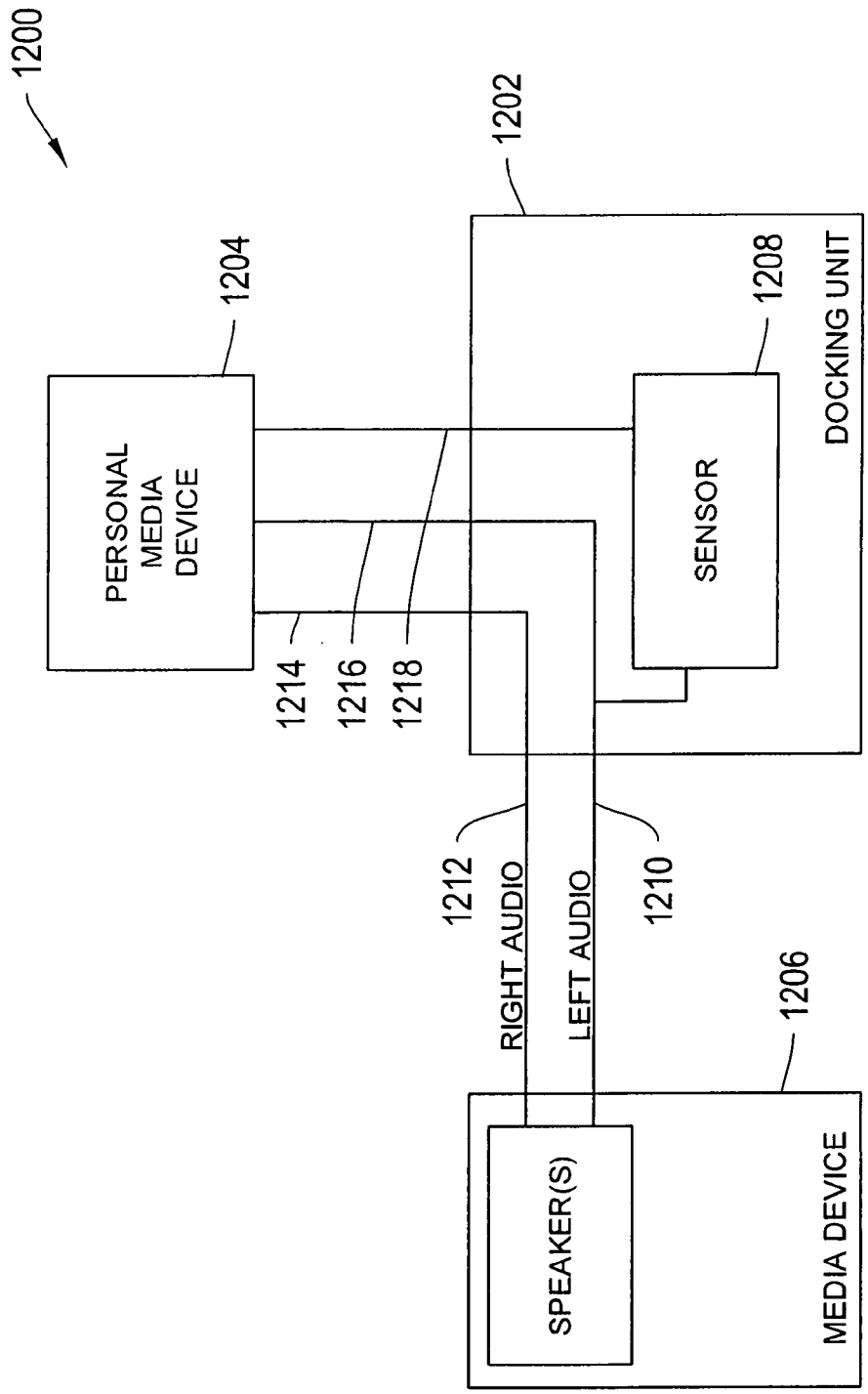
FIG. 12 shows a functional block diagram of a media system having a docking station interfacing with a docked personal media device and another media supporting device according to an illustrative embodiment of the invention.

FIG. 12 shows a functional block diagram of a media system 1200 having a docking station 1202 interfacing with a docked personal media device 1204 and accessory media supporting device 1206 according to an illustrative embodiment of the invention. The docking station 1202 includes a sensor 1208 that can be connected to left audio output line 1210. The media supporting device 1206 can be connected to the docking station 1202 via a data cable including left audio output line 1210 and right audio output line 1212. The media device 1204 can also be connected to docking station 1202 via right audio output line 1214 and left audio output line 1216. The sensor 1208 may include at least one indicator line 1218 that provides and indicator signal to the media device 1204 when the media supporting device 1206 is connected to the docking station 1202. The media supporting device 1206 may include one or more speakers 1220 that are connected to the audio output lines 1210 and 1212.

In operation, when the media device 1204 is docked with the docking station 1202, the devices are connected via a connector including at least lines 1214, 1216, and 1218. The connector may be a 30-pin connector that is capable of supporting additional data communication lines between the media device 1204 and the docking station 1202. The sensor 1208 may be in communication with one of the audio output lines, e.g., audio output line 1210, to enable the sensor to detect when the media supporting device 1206 is connected to or disconnected from the docking station 1202. When the sensor 1208 detects that the media supporting device 1206 is connected, via a data or audio cable and connector, to the docking station 1202, the sensor 1208 sends an indicator signal via the indicator line 1218 to the media device 1204 to inform the media device 1204 that the media supporting device is connected with the docking station 1202. The sensor 1208 may also detect when the media supporting device 1206 is disconnected from the docking station 1202 by monitoring one of the audio output lines, e.g., left audio output line 1210. The sensor 1208 may then send an indicator signal to the media device 1204 to inform the media device 1204 that the media supporting device 1206 has been disconnected.

A controller, such as processor 302 of FIG. 3, may monitor and/or receive the indicator signal via line 1218 which the controller may then use to determine whether to route audio signals to internal speakers or to an external device via lines 1214 and 1216. The sensor 1208 via the line 1218 or another data communication line between the media device 1204 and docking station 1202 may provide identification and/or presence information to the media device 1204. The presence information may provide a first indication value when the media supporting device 1206 is connected to the docking station 1202 and a second different indication value when the media supporting device 1206 is not connected to the docking station 1202. Thus, the media device 1204, in one embodiment, monitors or queries the docking station 1202 via the indicator line 1218 or another data communications line to determine the indicator value and whether the media supporting device 1206 is connected and able to receive audio signals, or other data signals, via the docking device 1202.

Figure 13A:
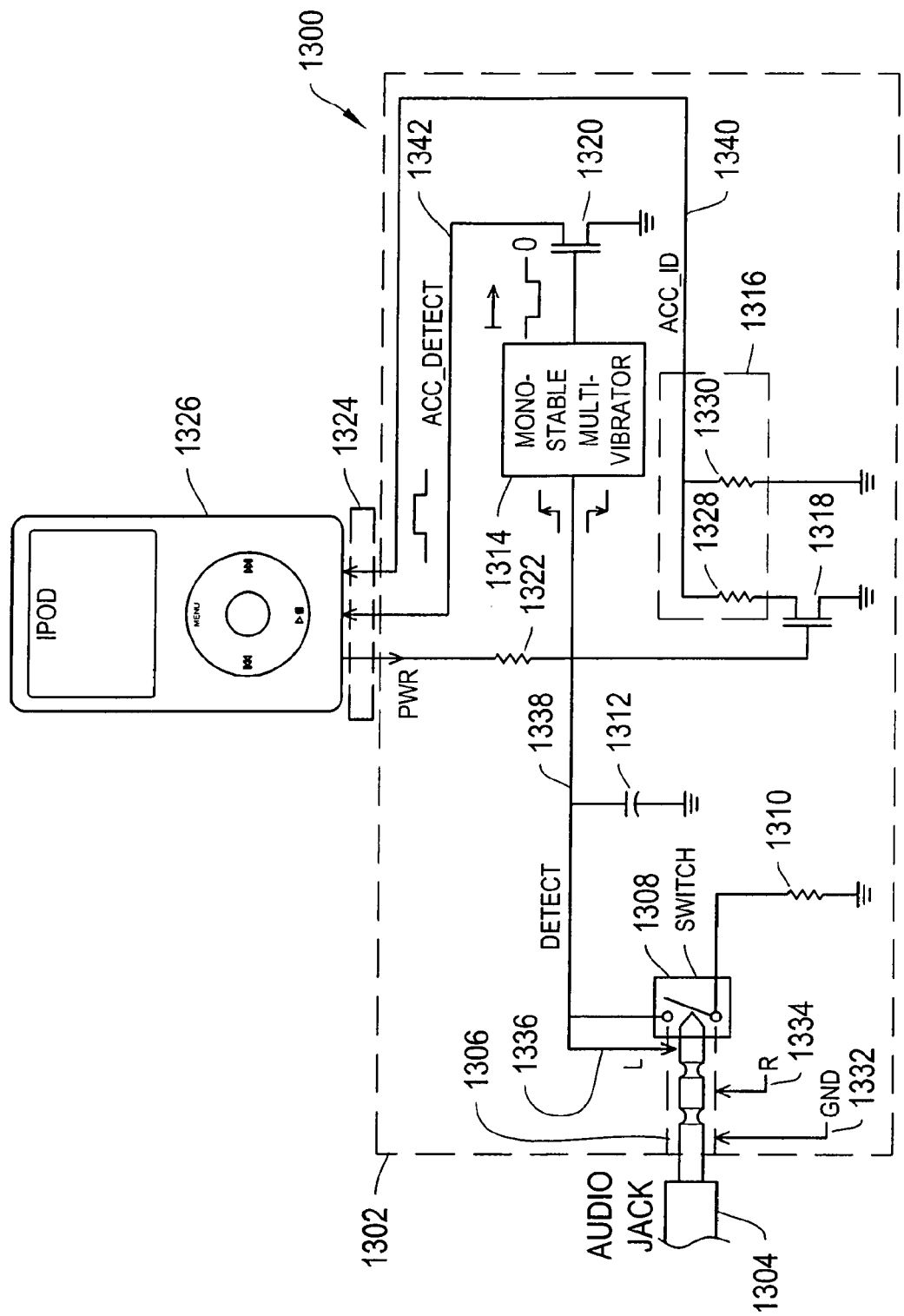
FIG. 13A shows a schematic diagram of a sensor circuit within a docking station that detects the insertion of an audio connector into an audio jack according to an illustrative embodiment of the invention.

FIG. 13A shows a schematic diagram of a sensor circuit 1300 within a docking station 1302 that detects the insertion or removal of an audio jack or plug 1304 into an audio jack receptacle 1306 according to an illustrative embodiment of the invention. The audio jack 1304 may be cylindrical in shape. The audio jack 1304 may include two or more contacts. In one embodiment, the sensor 1300 can include a switch 1308, switch resistor 1310, filter capacitor 1312, detector element 1314, resistive network 1316, transistor 1318, transistor 1320, power supply resistor 1322, and media device connector 1324. The media device connector 1324 may connect to a media device 1326 when the media device 1326 is docked to the docking station 1302. In certain embodiments, the media device 1326 can include an audio music player, video player, or combination audio/video player such as, without limitation, an iPod or iPhone available from Apple Inc., of Cupertino, Calif. In one embodiment, the resistive network includes resistor 1328 and resistor 1330. The resistor 1328 may have a resistive value R1 while resistor 1330 may have a resistive value R2. In certain embodiments the resistive value R2 is a factor of about 2, 3, 4, 5, 6, 7, 8, 9 or 10 greater than the resistive value R1. In certain embodiments, the value of R1 is less than or equal to about 10 k Ohms, 20 k Ohms, 50 k Ohms, 75 k Ohms, 90 k Ohms, 100 k Ohms, 150 k Ohms, 200 k Ohms, and 500 k Ohms.

In another embodiment, the audio jack 1304 includes three contacts 1332, 1334, and 1336 for ground, right audio output, and left audio output respectively. The audio jack 1304 may be connected to a peripheral media supporting device, such as media supporting device 1206 of FIG. 12. In certain embodiments, the detector element 1314 includes a monostable multivibrator circuit. The monostable mulivibrator circuit may, for example, include one of more discrete transistors, or include a LM555 timer integrated circuit (IC) as sold by National Semiconductor of Santa Clara, Calif., or include like IC components. The sensor circuit 1300 may reside at least partially on a circuit board, PCB, or assembly such as circuit assembly 674 of FIG. 6.

In operation, when the audio jack 1304 is inserted into audio jack receptacle 1306, the switch 1308 is opened by the audio jack 1304. The switch 1308 may include a mechanical, electrical, magnetic, and/or optical sensor and/or actuator to effect the opening or closing of the electrical connection operated by the switch. In the embodiment of FIG. 13A, the switch 1304 is mechanically opened by insertion of the audio jack 1304. When the switch 1308 is opened, the electrical connection on DETECT line 1338 with ground through resistor 1310 is removed, causing the voltage on the DETECT line 1338 to increase, float, and/or rise to a higher voltage. The detector element 1314, e.g., a monostable multivibrator (or "one-shot"), detects the rising voltage on the DETECT line 1338 and generates a pulse on this edge, which un-grounds the ACC_DETECT line 1342 for a indication period, and then re-grounds the ACC_DETECT line 1342.

The ACC_DETECT line 1342 is un-grounded because the output of the detector element 1314 drive a MOSFET transistor, e.g., NFET 1320, from a conducting state to a less conducting, near cutoff, and/or cutoff state, resulting in a positive pulse on the ACC_DETECT line 1342. In one embodiment, the indication period or time period of the pulse is about 300 msec. In other embodiments, the indication period is less than or equal to about 1000 msec, 500 msec, 400 msec, 300 msec, 200 msec, 100 msec, or 50 msec. In one embodiment, the media device 1326, being connected to the ACC_DETECT line 1342 via connector 1324, detects the pulse on the ACC_DETECT line 1342 which generates an accessory detached and subsequent accessory attached interrupt event in the media device 1326. In certain embodiments, the media device includes a processor, such as processor 302 of FIG. 3, that is connected to the ACC_DETECT line 1342 which detects the pulse generated by insertion of the audio jack 1304. The types of transistors used in the sensor circuit may vary and include, without limitation, MOSFETs, NFETs, PFETs, JFETs, NPNs, PNPs, and other like transistor elements.

In one embodiment, because the ACC_DETECT pulse provides an indication that the audio jack 1304 may have been inserted or removed, a processor of the media device 1326, e.g., processor 302, determines whether the audio jack 1304 was inserted or removed by monitoring the resistive network 1316 via the ACC_ID line 1340. Thus, in certain embodiments, the ACC_DETECT pulse acts as a connection event signal that informs to media device 1326 that an accessory media device may have be attached or detached from the docking station 1302. When the switch 1308 opens due to the insertion of the audio jack 1304, the voltage on the DETECT line 1338 floats high. The higher voltage on the DETECT line 1338 causes the NFET 1318 to conduct, effectively placing the resistor 1328 in parallel with the resistor 1330. When the NFET 1318 is not conducting, there is no current flow through the resistor 1328 and, therefore, the value of the resistive network is about equal to the value of the resistor 1330, e.g., about the value R2. By effectively placing these resistors in parallel when the NFET 1318 is conducting, the combined resistance value R3 of the resistive network 1316 decreases to a value less than the value R1 of resistor 1328. For example, because R1 and R2 are in parallel, the resistive network 1316 resistance value R3 is equal to about R1×R2/(R1+R2) Ohms=R3 Ohms.

In one embodiment, when the processor in the media device 1326 receives the ACC_DETECT pulse, the processor then queries the ACC_ID line 1340 via the connector 1324 to determine a value associated with the resistive network 1316 that is related to its resistance. For example, the processor may monitor the voltage, current, or resistance on the ACC_ID line 1340. If the resistance is R3 Ohms or a corresponding voltage or current is detected, the media device 1326 determines that the audio jack 1304 is inserted and, therefore, an accessory media supporting device is connected to the docking station 1302. Then, the media device 1326 processor can determine whether to route audio signals to the docking station 1302 via the connector 1324 which are subsequently routed to the media supporting device via the audio jack 1304.

In operation, when the audio jack 1304 is removed from the audio jack receptacle 1306, the switch 1308 is closed by the absence of the audio jack 1304. In the embodiment of FIG. 13A, the switch 1304 is mechanically closed by the removal of the audio jack 1304. When the switch 1308 is closed, the electrical connection on DETECT line 1338 with ground through resistor 1310 is established, causing the voltage on DETECT line 1338 to decrease to a lower voltage or approximately ground potential. The detector element 1314, e.g., a monostable multivibrator (or "one-shot"), detects the decreasing voltage on the DETECT line 1338 and generates a pulse on this decreasing edge, which un-grounds the ACC_DETECT line 1342 for a indication period, and then re-grounds the ACC_DETECT line 1342. The ACC_DETECT line 1342 is un-grounded because the output of the detector element 1314 drive the NFET transistor 1320 from a conducting state to a less conducting, near cutoff, and/or cutoff state, resulting in a positive pulse on the ACC_DETECT line 1342.

In one embodiment, the indication period or time period of the pulse is about T1 msec. In certain embodiments, the indication period is less than or equal to about 1000 msec, 500 msec, 400 msec, 300 msec, 200 msec, 100 msec, or 50 msec. In one embodiment, the media device 1326, being connected to the ACC_DETECT line 1342 via connector 1324, detects the pulse on the ACC_DETECT line 1342 which generates an accessory detached and subsequent accessory attached interrupt event in the media device 1326. In certain embodiments, the media device includes a processor, such as processor 302 of FIG. 3, that is connected to the ACC_DETECT line 1342 which detects the pulse generated by removal of the audio jack 1304.

In one embodiment, because the ACC_DETECT pulse provides an indication that the audio jack 1304 may have been inserted or removed, a processor of the media device 1326, e.g., processor 302, then determines whether the audio jack 1304 was inserted or removed by monitoring the resistive network 1316 via the ACC_ID line 1340. When the switch 1308 closes due to the removal of the audio jack 1304, the voltage on the DETECT line 1338 is pulled low by the connection to ground through the resistor 1310. The lower voltage on the DETECT line 1338 causes the NFET transistor 1318 to decrease conducting, stop conducting, or cutoff, effectively removing the resistor 1328 from the resistive network 1316. When the NFET transistor 1318 is not conducting, there is no current flow through the resistor 1328 and, therefore, the value of the resistive network is about equal to the value of the resistor 1330, e.g., about R2 Ohms.

In one embodiment, when the processor in the media device 1326 receives the ACC_DETECT pulse, the processor then queries the ACC_ID line 1340 via the connector 1324 to determine a value associated with the resistive network 1316 that is related to its resistance. For example, the processor may monitor the voltage, current, or resistance on the ACC_ID line 1340. If the resistance is R2 Ohms or a corresponding voltage or current is detected, the media device 1326 determines that the audio jack 1304 is not present in the receptacle 1306 and, therefore, a media supporting device is not connected to the docking station 1302. With no media supporting device attached to the docking station, the media device 1326 processor routes audio signals to its internal speakers as opposed to the docking station 1302. In other embodiments, the various components of the sensor 1300 may be biased to provide signals of different potentials than shown in the exemplary embodiment of FIG. 13A. For example, the detector element 1314 and NFET transistor 1320 may be biased so as to produce a negative pulse on the ACC_DETECT line 1342 which may be used by a processor of the media device 1326 to detect an attach/detach event.

Figure 13B:
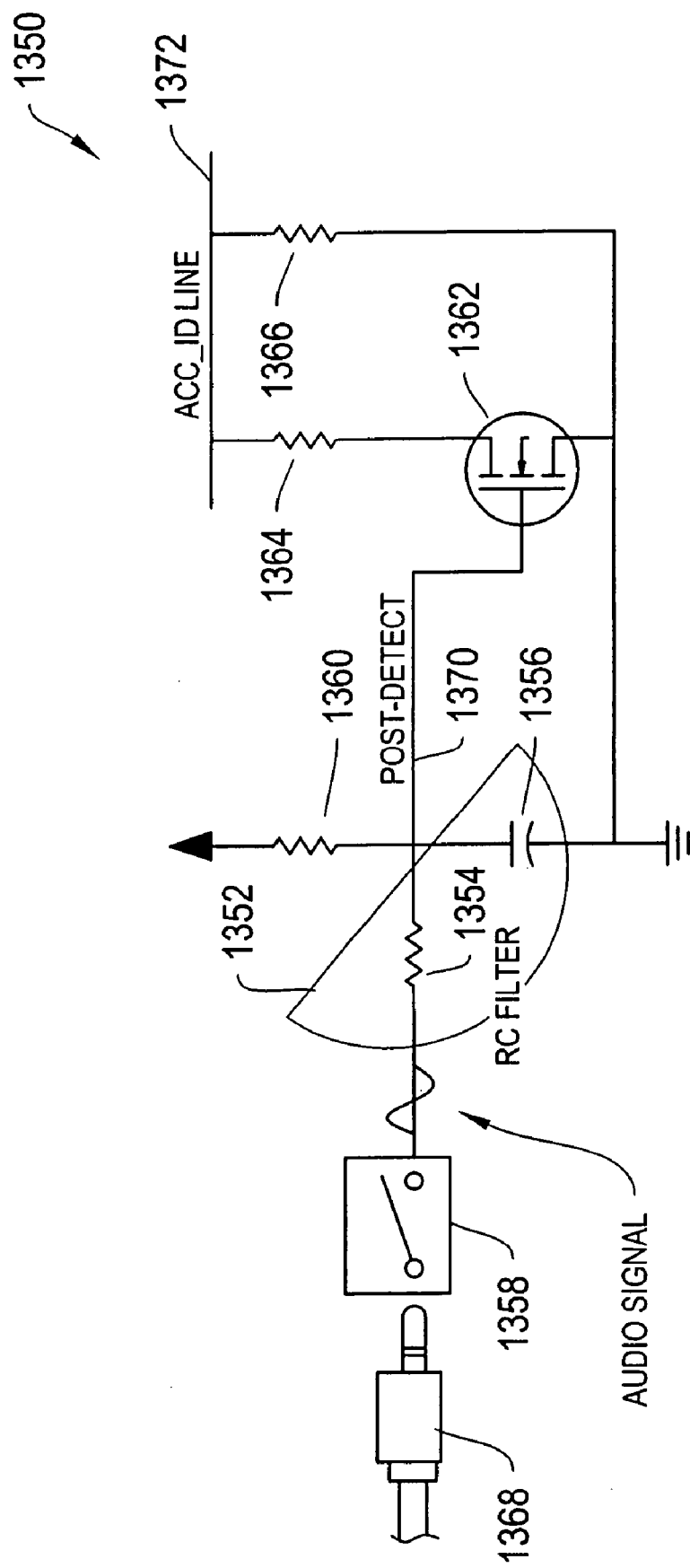
FIG. 13B shows a schematic diagram of a sensor circuit within a docking station including an RC tuned filter to reduce the coupling of audio to the DC voltage lines according to an illustrative embodiment of the invention.

FIG. 13B shows a schematic diagram of a sensor circuit 1350 within a docking station including an resistive-capacitive (RC) tuned filter 1352 to reduce the coupling of audio to the DC voltage lines according to an illustrative embodiment of the invention. In one embodiment, the RC filer includes resistor 1354 and capacitor 1356. The sensor circuit 1350 also includes switch 1358, resistor 1360, NFET transistor 1362, identification resistor 1364 and identification resistor 1366. An audio jack 1368 operates to open or close the switch 1358 and carry an audio signal to an accessory device, e.g., a media supporting device.

In certain embodiments, the RC filter 1352 functions as a low pass filter to reduce and/or prevent the coupling of audio signals to the DC voltage on the post-detect line 1370, ACC_ID line 1372, and/or detect line 1338 of FIG. 13A. In one embodiment, the RC filter 1352 has about a 3 db corner frequency of about 7.98 Hz.

In certain embodiments, the RC filter 1352 is tuned to balance the need to filter the audio signal with the need for the NFET transistor 1362 to switch states rapidly enough to provide the proper resistive value on the ACC_ID line 1372 when checked by the media device 1326. Tuning may be achieved by adjusting the value of one or both of the resister 1354 and capacitor 1356. In certain embodiments, either one or both the resister 1354 and capacitor 1356 may be adjustable to enable in circuit adjustment or tuning. By increasing the filtering of the audio signal using the RC filter 1352, the speed of switching of the NFET transistor 1362 may be reduced. This resulting slow switching of the NFET transistor 1362, may cause the NFET transistor 1362 to operate in the saturation region for a significant amount of time, effectively acting as a common-source amplifier, which may result in the NFET transistor 1362 amplifying the audio signal onto the ACC_ID line 1372. Thus, by reducing the filtering, the NFET transistor 1362 advantageously switches more rapidly, while still reaching a DC "low" voltage enough to keep the NFET transistor 1362 gate voltage below Vth, even with the coupled AC audio signal.

Figure 14:
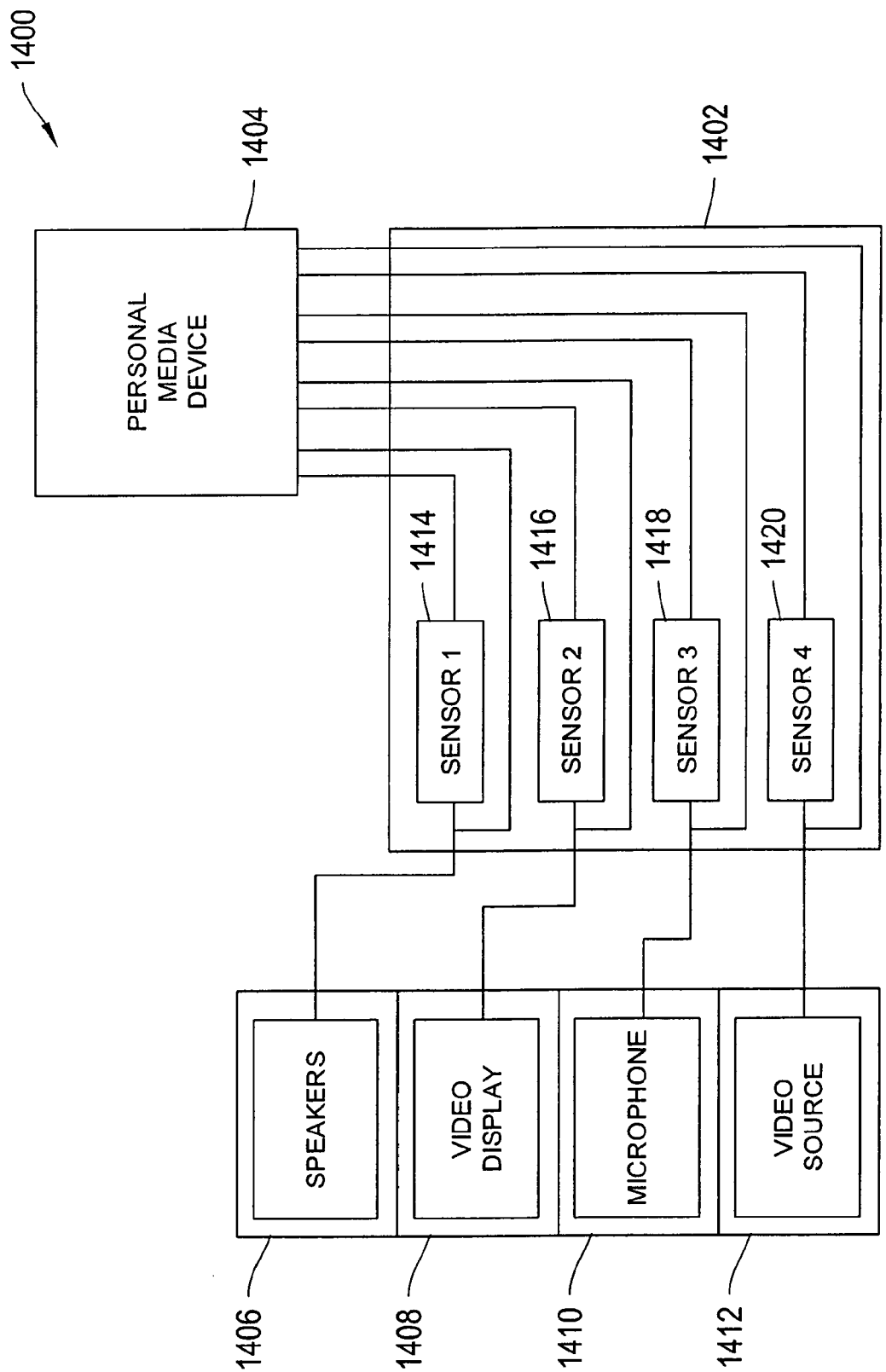
FIG. 14 shows a functional block diagram of a media system including a docking station interfacing with a docked personal media device and multiple media supporting devices according to an illustrative embodiment of the invention.

FIG. 14 shows a functional block diagram of a media system 1400 including a docking station 1402 interfacing with a docked personal media device 1404 and multiple media supporting devices 1406, 1408, 1410, and 1412 according to an illustrative embodiment of the invention. In an alternative embodiment, the media supporting devices 1406-1412 are combined into a single media supporting device that includes multiple data communication interfaces with the docking station 1402 and personal media device 1404.

In operation, the docking station 1402 includes a plurality of data communication interfaces and connectors in addition to a connection with the docked personal media device 1404. Associated with each data communication connection is a sensor circuit 1414-1420. Each sensor circuit 1414-1420 is configured and operates in a manner as described with respect to sensor circuit 1300 of FIG. 13A. The docking station 1402 may support the delivery and/or receipt various types of data with one or more media supporting devices 1406-1412. When one of the accessory media supporting devices is connected to the docking station, a sensor, e.g., sensor 1414, detects the connection and provides an identification of the presence and/or type of device attached to the docking station 1402. Thus, for example, when a video source is connected to the docking station 1402, the sensor 1420 detects the connection and provides a presence indication and identification to the personal media device 1404. A processor within the personal media device 1404 may then determine whether to receive the video signals and, for example, display the video via a user interface or display of the personal media device 1404.

Figure 15:
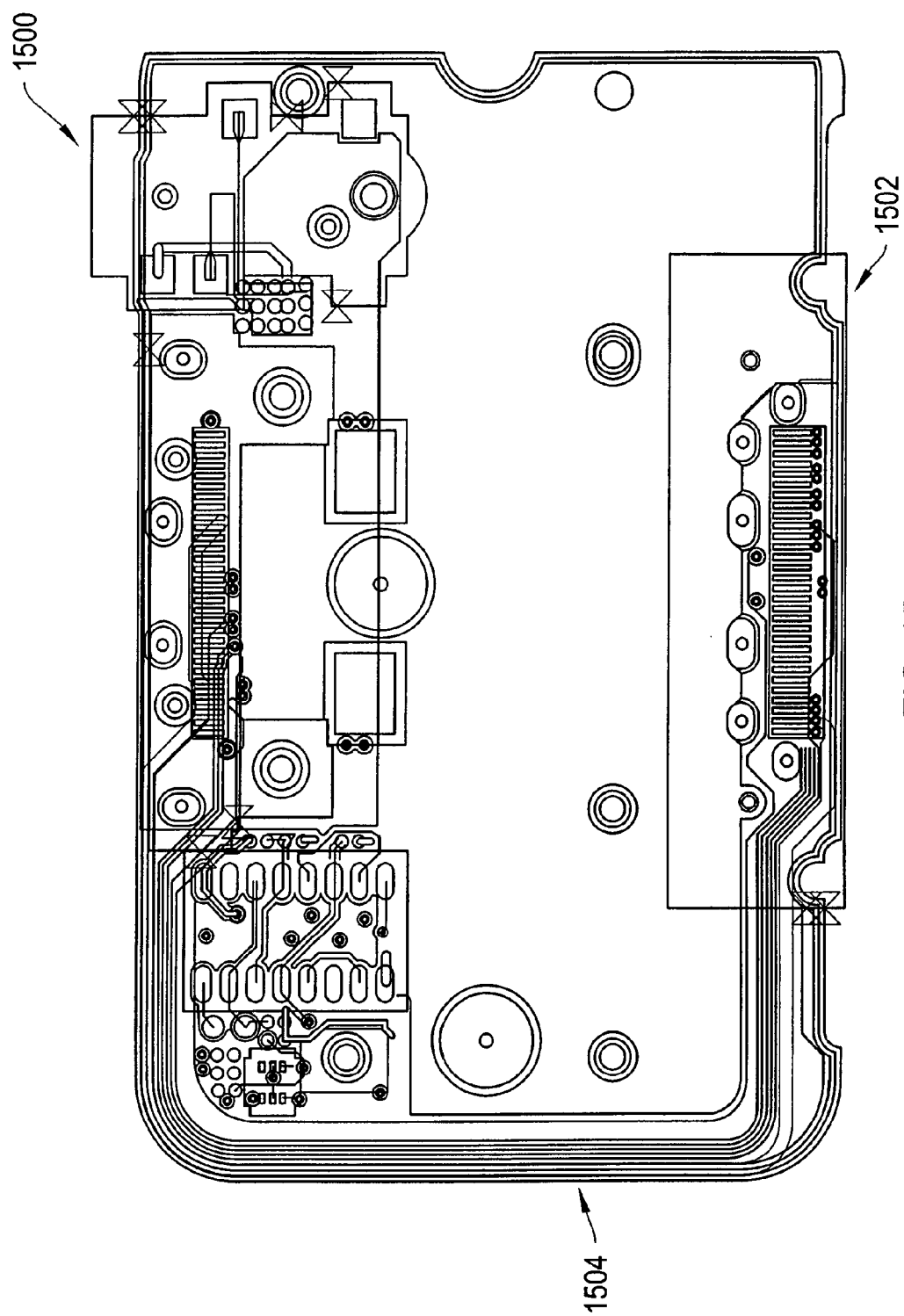
FIG. 15 shows a component layout diagram of a docking station according to an illustrative embodiment of the invention.

FIG. 15 shows a component layout diagram of a docking station 1500 according to an illustrative embodiment of the invention. In certain embodiments, a docked media device may include an antenna or other RF sensitive element that is positioned in close proximity to its connector with the docking station 1500. To minimize the adverse effects of RF interference with, for example, an antenna of the media device, the internal printed circuit board (PCB) may include bus routing and circuit component positioning in such a way as to minimize any de-sense to RF signals reaching the media device antenna or other sensitive components. In one embodiment, all or a substantial portion of the signal buses 1504 are routed to the left side of the PCB inside the docking station because the right side of the docked media device is sensitive to RF interference. In certain embodiments, the amount of metal or other conductive material is minimized on the PCB to reduce electromagnetic and/or RF interference with a docked media device. In a further embodiment, a multilayer PCB is employed to reduce interference, such as a six-layer PCB. In other embodiments, at least a two-layer, three-layer, four-layer, five-layer, seven-layer, or ten-layer PCB is employed.

Figure 16:
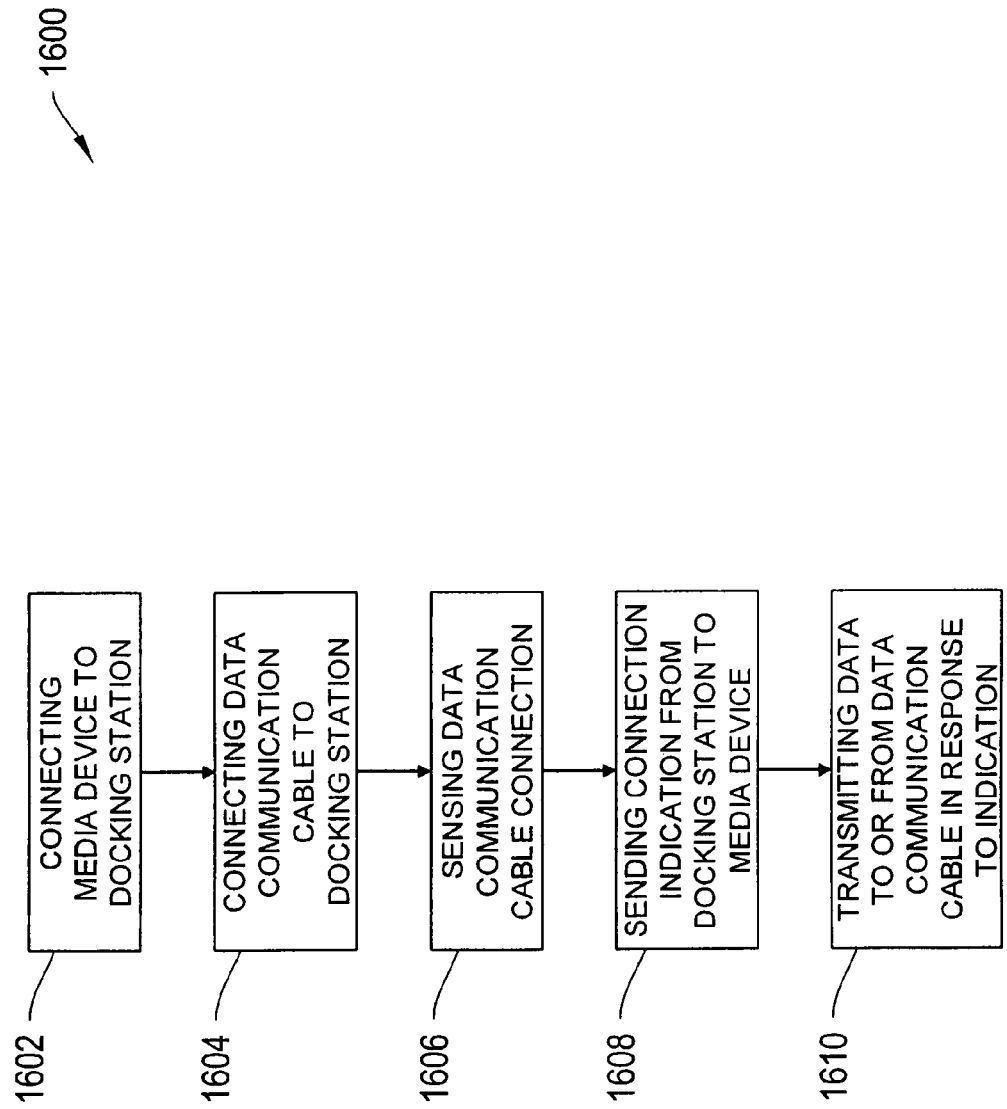
FIG. 16 is a flow chart of a process for sensing when a media supporting device is connected to a docking station and informing a docked media device of the connection according to an illustrative embodiment of the invention.

FIG. 16 is a flow chart of a process 1600 for sensing when a media supporting device is connected to a docking station and informing a docked media device of the connection according to an illustrative embodiment of the invention. First, a media device 1326 is connected to a docking station 1302 (Step 1602). Then, a data communications cable having an audio jack 1304 from a media supporting device is connected to the docking station 1302 via the receptacle 1306 (Step 1604). The sensor 1300 senses that the data communications cable and audio jack 1304 are connected when the switch 1308 opens (Step 1606). The sensor 1300 then sends an indication signal via ACC_DETECT line 1342 from the docking station 1302 to the media device 1326. The sensor 1300 may also send an identification indication signal via ACC_ID line 1340 from the docking station 1302 to the media device 1326 (Step 1608). Once the media device 1326 determines that a media supporting device is connected via audio jack 1304, the media device 1326 may transit or receive data via the communications cable connected to the audio jack 1304 in response to the media supporting device presence indication signals on the ACC_DETECT and ACC_ID lines 1342 and 1340 (Step 1610).

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow. For example, the detection of the insertion or removal of a plug or jack may apply to any system in addition to a docking station.

What is claimed is:

1. A docking device comprising:
    a first connector for exchanging data with a media device;
    a second connector for exchanging data with a media supporting device; and
    a sensor for detecting when the media supporting device is connected to the second connector, the sensor further comprising:
        a resistor network operative to provide a first resistance value when the media supporting device is not connected to the second connector and a second resistance value when the media supporting device is connected to the second connector, the first resistance value operative to place the media device in a first data delivery mode, and the second resistance value operative to place the media device in a second data delivery mode; and
    circuitry that pulses a first conductor in the first connector in response to detecting when the media supporting device is connected to the second connector, the pulse operative to cause the media device to query a second conductor in the first connector to determine a value associated with the resistor network.

2. The device of claim 1, wherein the media device is an MP3 player, video player, wireless communications device, cellular telephone, multimedia device, personal digital assistant, or portable computer.

3. The device of claim 1, wherein the media supporting device is a video display, a computer, a stereo system, audio speaker system, radio receiver, set top box, television, digital video recorder, digital video source, audio signal source, or media device.

4. A method for detecting a connection to a docking device comprising:
    connecting the docking device to a media device via a first connector;
    sensing, at the docking device, when a media supporting device is connected to a second connector of the docking device; and
    pulsing a first conductor in the first connector in response to sensing when the media supporting device is connected to the second connector, the pulsing operative to cause the media device to query a second conductor in the first connector to determine a value associated with a resistor network, the resistor network operative to provide a first resistance value when the media supporting device is not connected to the one or more second connectors and a second resistance value when the media supporting device is connected to the one or more second connectors, the first resistance value operative to place the media device in a first data delivery mode, and the second resistance value operative to place the media device in a second data delivery mode.

5. The device of claim 4, wherein the media device is an MP3 player, video player, wireless communications device, cellular telephone, multimedia device, personal digital assistant, or portable computer.

6. The method of claim 4, wherein the media supporting device is a video display, a computer, a stereo system, audio speaker system, radio receiver, set top box, television, digital video recorder, digital video source, audio signal source, or media device.

* * * * *